Figure 1:
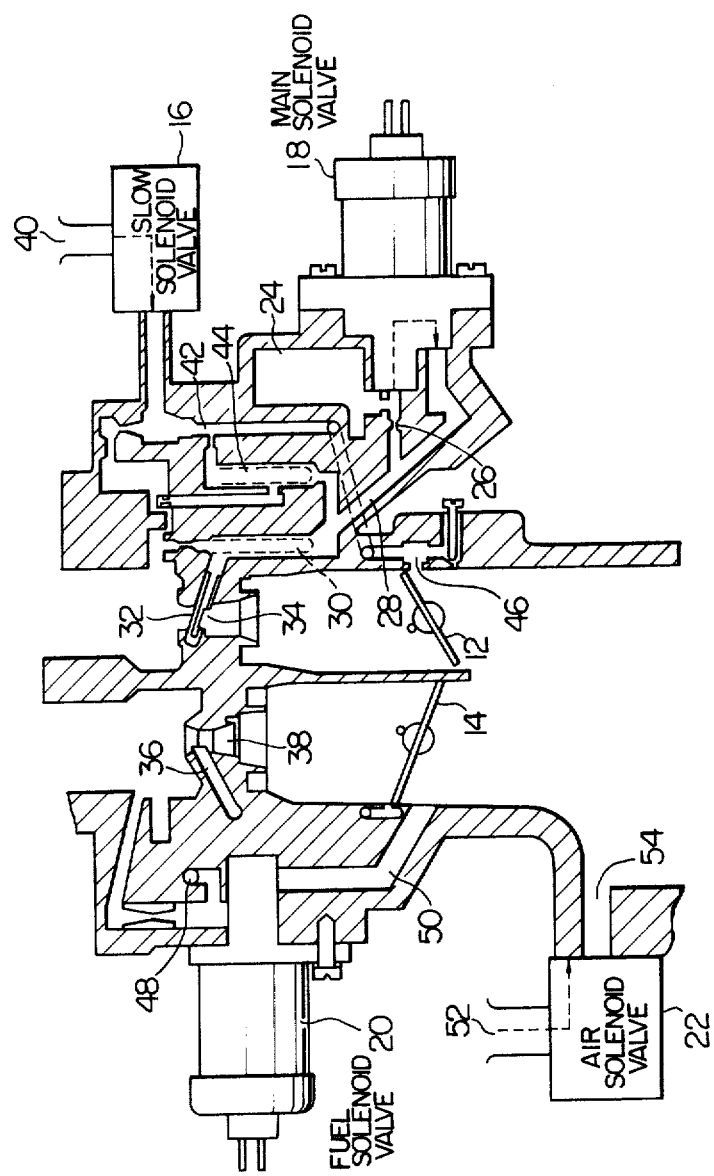

United States Patent [19]

Furuhashi

[11] 4,337,513

[45] Jun. 29, 1982

[54] ELECTRONIC TYPE ENGINE CONTROL METHOD AND APPARATUS

[75] Inventor: Toshio Furuhashi, Mito, Japan

[73] Assignee: Hitachi, Ltd., Tokyo, Japan

[21] Appl. No.: 137,519

[22] Filed: Apr. 4, 1980

[30] Foreign Application Priority Data

Apr. 6, 1979 [JP] Japan .................................. 54-40901
Jun. 6, 1979 [JP] Japan .................................. 54-70067

[51] Int. Cl.³ .......................... G06F 9/46; G05B 15/02
[52] U.S. Cl. ............................... 364/431.11; 364/200
[58] Field of Search ....................... 364/431, 200, 900; 123/416, 417, 480, 486, 489, 440

[56] References Cited

U.S. PATENT DOCUMENTS

| | | | |
|---|---|---|---|
| 3,905,025 | 9/1975 | Davis et al. ........................... | 364/200 |
| 3,969,614 | 7/1976 | Moyer et al. ......................... | 364/431 |
| 4,001,783 | 1/1977 | Monahan et al. .................... | 364/200 |
| 4,096,564 | 6/1978 | Inose et al. ........................... | 364/200 |
| 4,149,243 | 4/1979 | Wallis ................................... | 364/200 |
| 4,152,761 | 5/1979 | Louie .................................... | 364/200 |
| 4,153,934 | 8/1979 | Sato ...................................... | 364/200 |
| 4,163,282 | 7/1979 | Yamada et al. ....................... | 364/431 |
| 4,201,166 | 5/1980 | Nishimura et al. ................... | 123/440 |
| 4,248,187 | 2/1981 | Matsui et al. ...................... | 123/489 X |
| 4,255,789 | 3/1981 | Hartford et al. ..................... | 364/431 |

FOREIGN PATENT DOCUMENTS

2841750 4/1980 Fed. Rep. of Germany ...... 364/431

OTHER PUBLICATIONS

Korn: (Text book), Microprocessors and Small Digital Computer Systems for Engineers and Scientists, McGraw Hill Book Co., 1977, pages of interest: 2, 3, 140-155, 260-271.

*Primary Examiner*—Felix D. Gruber
*Attorney, Agent, or Firm*—Craig & Antonelli

[57] ABSTRACT

A process for electronically controlling an internal combustion engine employ a plurality of engine controlling programs to be executed by a central processing unit classified into a number of task programs in accordance with processing functions of the CPU. The periods at which the task programs are to be activated are determined in consideration of the influential significance of the tasks in controlling the engine, whereby the task programs are executed in accordance with the activation periods thereof under supervision of a program for monitoring the plurality of the engine control programs.

46 Claims, 33 Drawing Figures

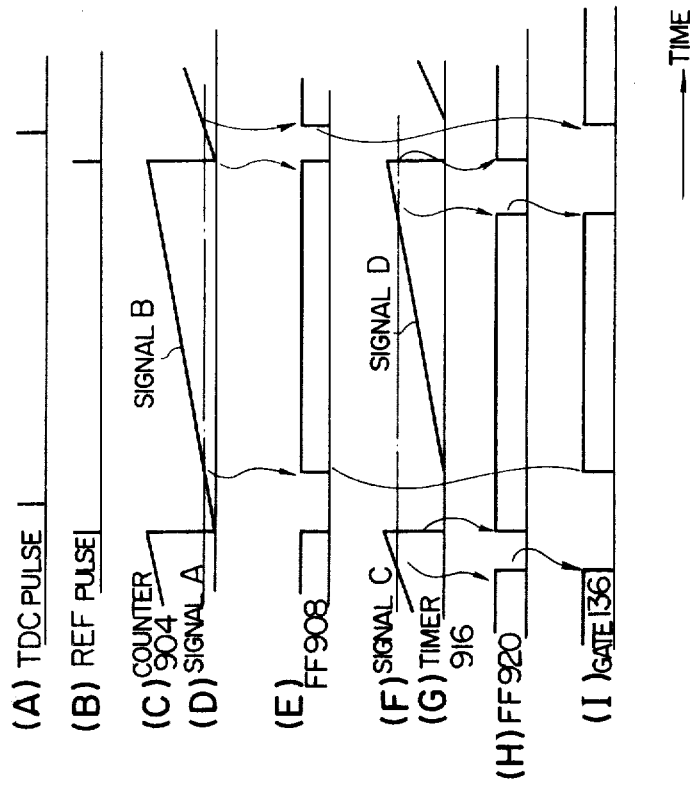
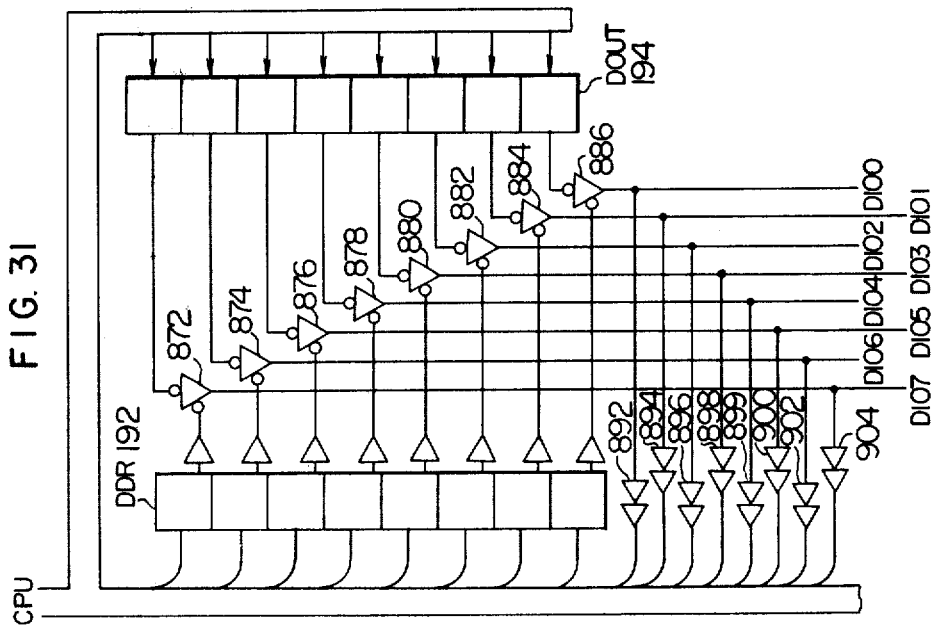

ELECTRONIC TYPE ENGINE CONTROL METHOD AND APPARATUS

The present invention relates to a method of electronically controlling operation of an internal combustion engine and a system for carrying out the same. More particularly, the invention is directed to an electronic type engine control method and system in which the internal combustion engine is controlled through digital processing operations and arithmetic operations of a central processing unit (hereinafter referred to simply as CPU in abridgement).

A method and a system for controlling an internal combustion engine (hereinafter simply referred to also as the engine) through the use of a program processor are disclosed in U.S. Pat. Nos. 3,969,614 and 4,163,282. According to the prior art control techniques, a series of programs prepared for fetching information from various sensors for detecting engine operating conditions and setting control quantities for every function to be controlled are executed in accordance with the detected operating conditions to thereby control the operation of the engine. Such control programs include a fuel quantity control program, an ignition timing program and an engine initiation program, for example. The fuel quantity control program and the ignition timing control program are executed in synchronism with the detection of a predetermined crank angle during rotation of the engine crankshaft, whereby signals representing the fuel supply quantity as well as the ignition timing advance angle, which are arithmetically determined through execution of the programs described above, are supplied to associated pulse output circuits.

In the engine control system in which programs are executed on the basis of certain conditions of the engine, the load state of the central control unit or CPU undergoes remarkable variations in dependence on the operating conditions of the engine to a great disadvantage.

Accordingly, when the operating conditions change rapidly, the load imposed on CPU will vary correspondingly remarkably, involving degradation in the serviceability of the CPU. Assuming, for example, that the operation speed of the engine varies from a low speed to an intermediate speed and then to a high speed, the number of requests for arithmetic operations issued to the CPU, i.e. the number of tasks to be executed, will be increased as the engine speed is increased, eventually resulting in a condition such that it becomes difficult for the CPU to deal with the increased number of requests. On the other hand, the load ratio of the CPU is decreased at a low speed operation of the engine, which means that capability of CPU is not fully utilized. In this way, the hitherto known control method and system cannot provide control functions in a manner satisfactorily compatible with the processing capability of the CPU.

Further, when the contents of one of the plural control programs has to be altered and new programs have to be added, all the programs need to be renewed in the case of the control systems disclosed in the patent specifications recited above.

In addition, there is provided no supervisory program for monitoring the execution of the plural control programs in the case of the prior art control systems.

An object of the present invention is to provide a method and a system for controlling the operation of an internal combustion engine which assures improved control performance without suffering from the influence of variations in the operating conditions of the engine.

According to an aspect of the invention, a plurality of engine controls, performed by using a processor (specifically its CPU) are classified into a number of tasks in accordance with processing functions of the processor. Different activating intervals are allotted to task programs for executing the tasks in dependence on the effect thereof in controlling engine operation. Thus, the tasks playing an important role in engine control can be executed more frequently, wherein the load state of the CPU is substantially insusceptible to variations in the operating conditions of the engine. The processing capability of the CPU can thus be fully utilized to assure improved control performance.

According to an aspect of the invention, a supervisory program for supervising or monitoring the execution of task programs for controlling engine operation is provided so that the contents of a given control program can be altered or new programs can be easily added without any necessity to change other control or task programs.

Figure 2:
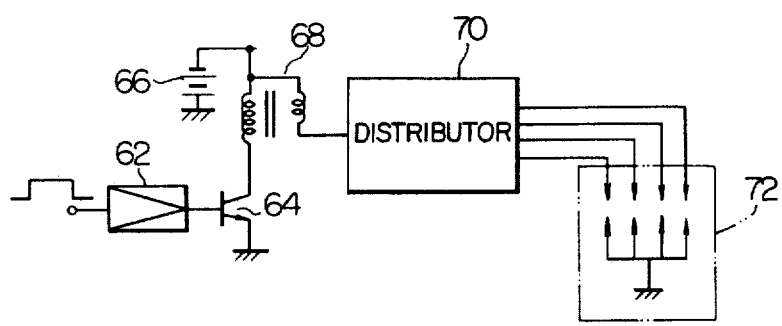
Figure 3:
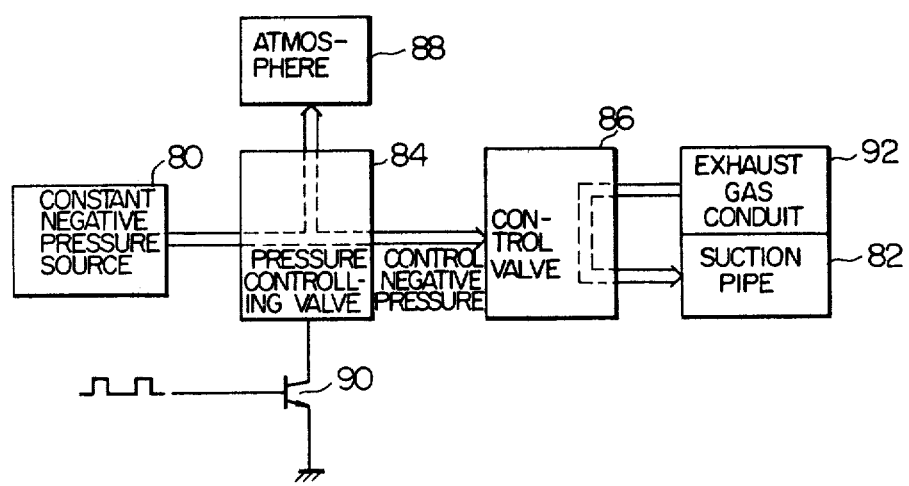
Figure 4:
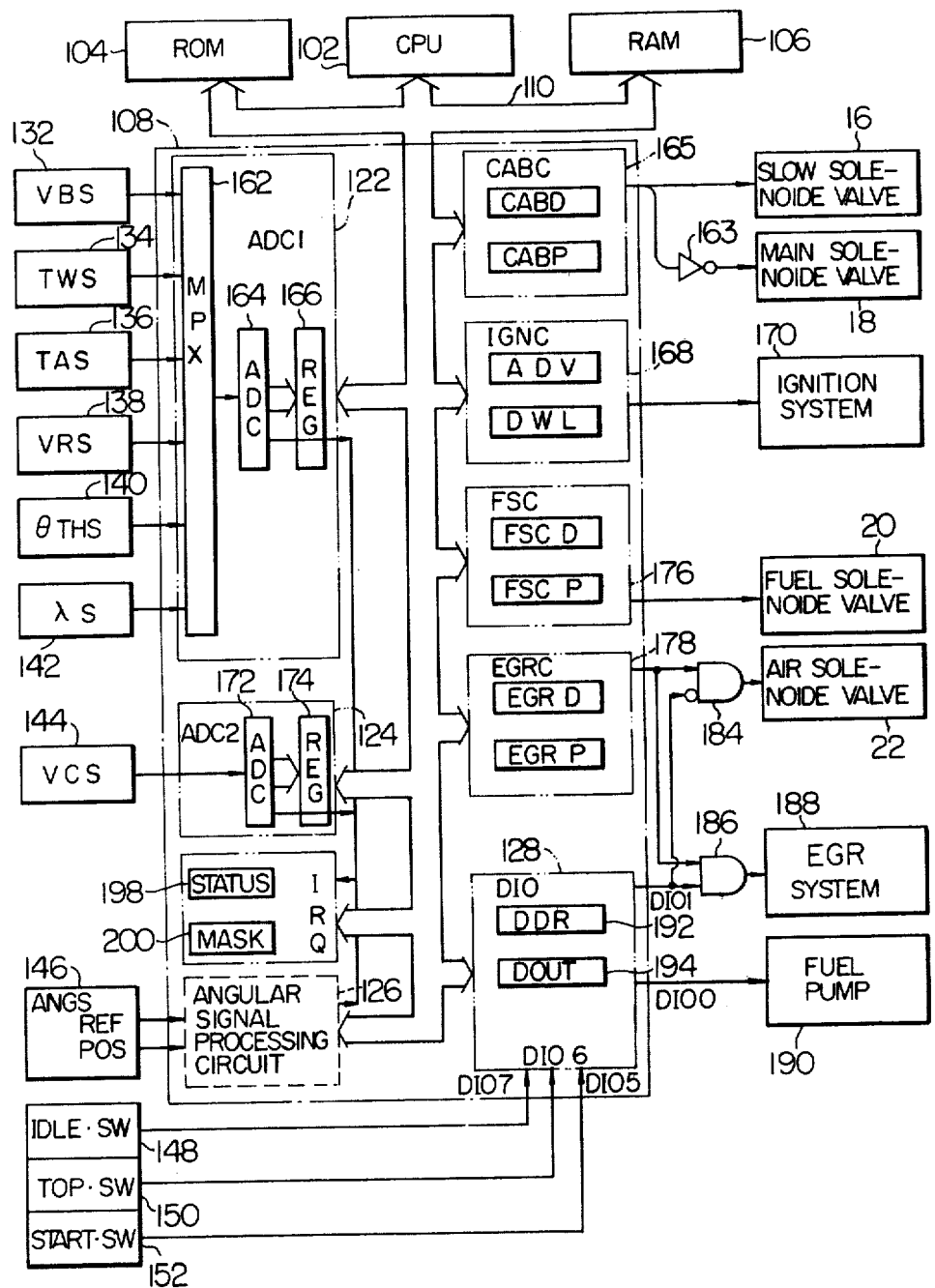
Figure 5:
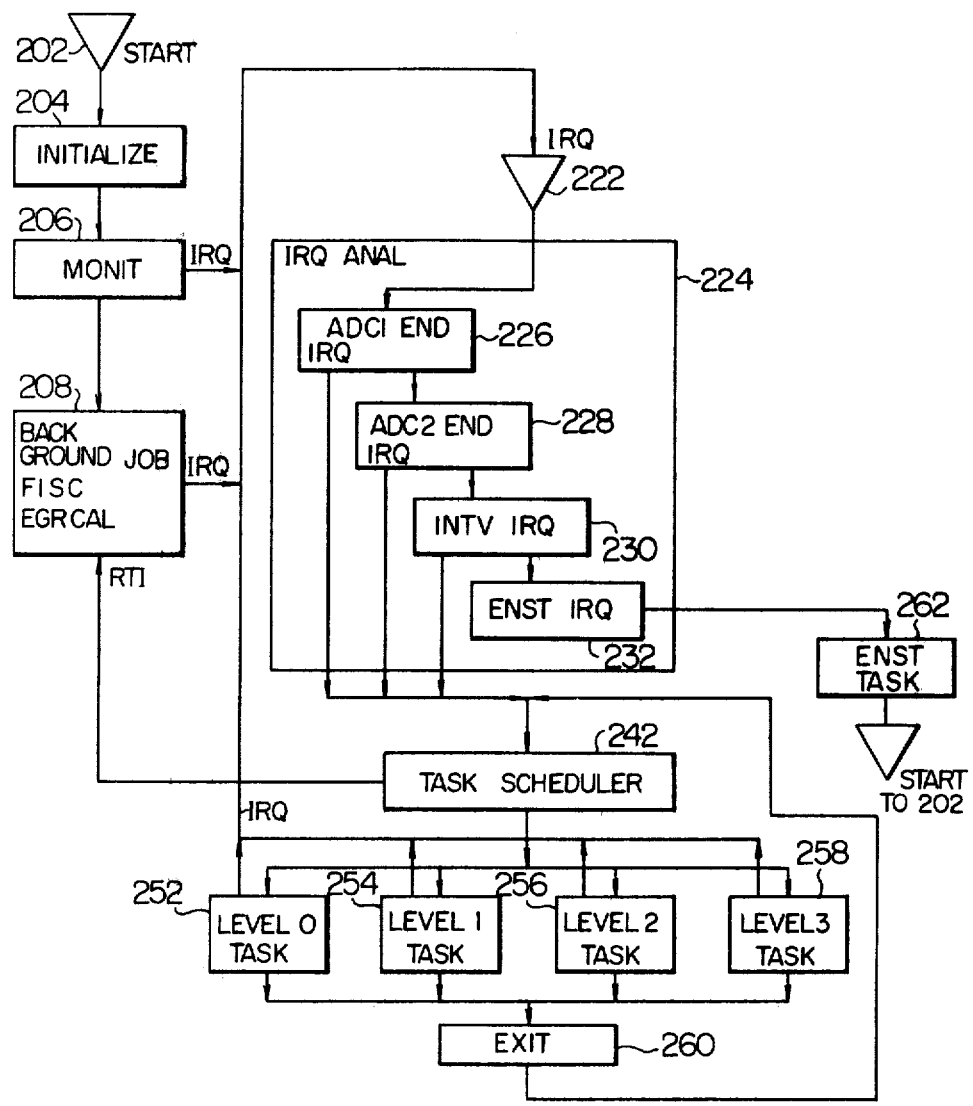
Figure 6:
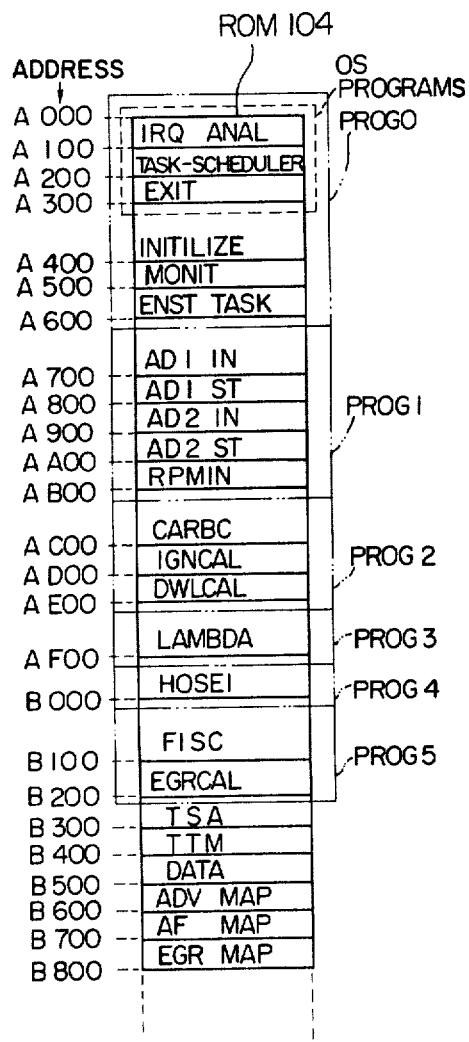
Figure 7:
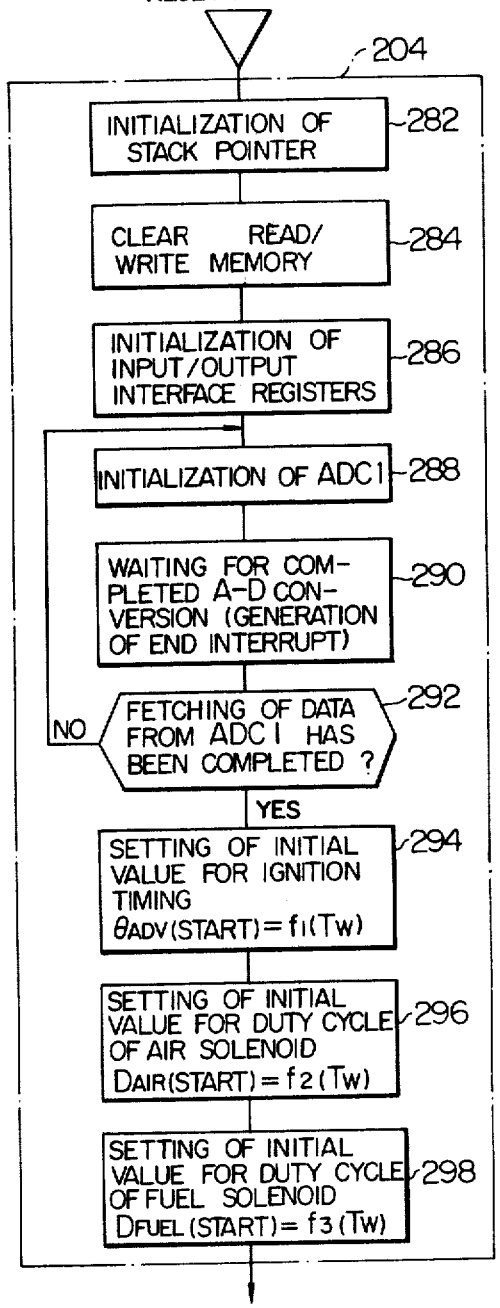
Figure 8:
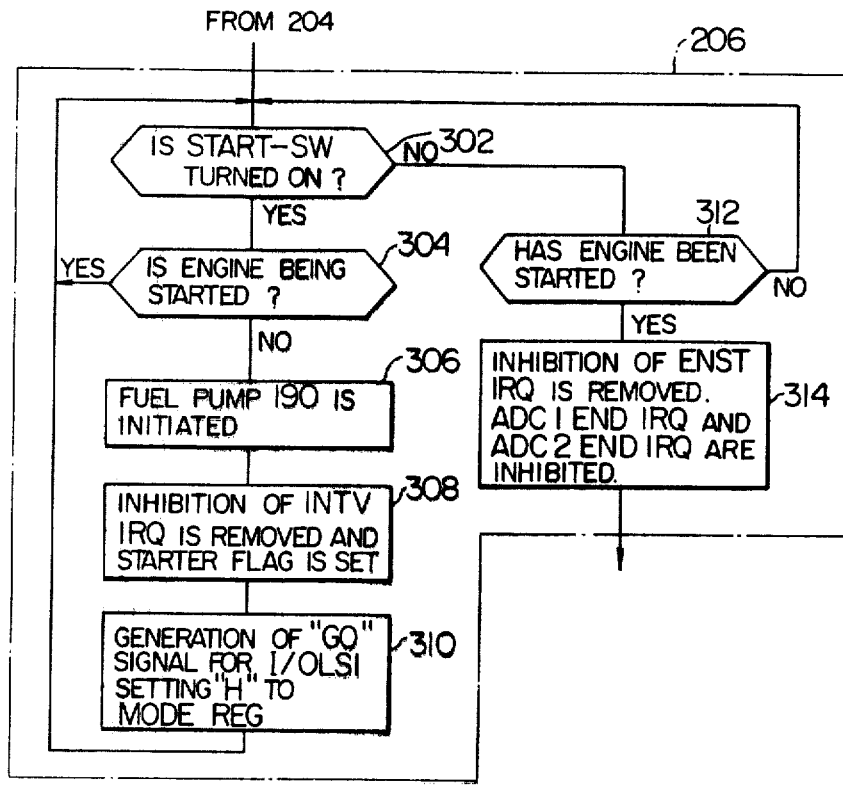
Figure 9:
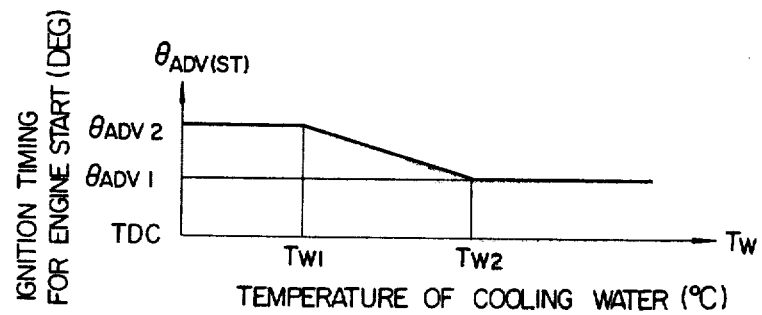
Figure 10:
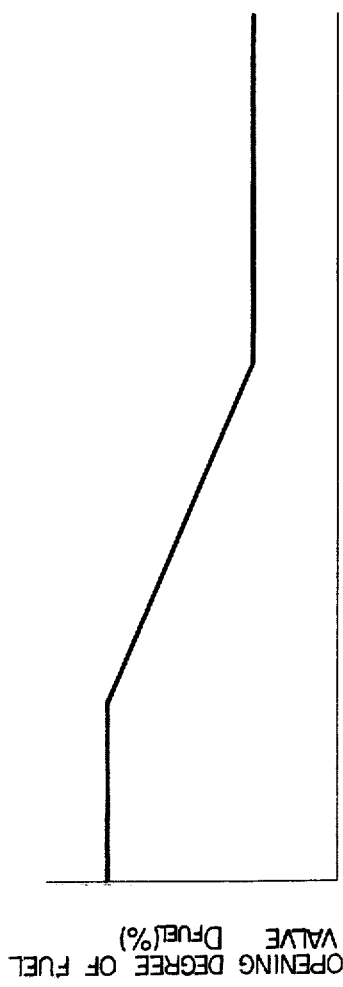
Figure 11:
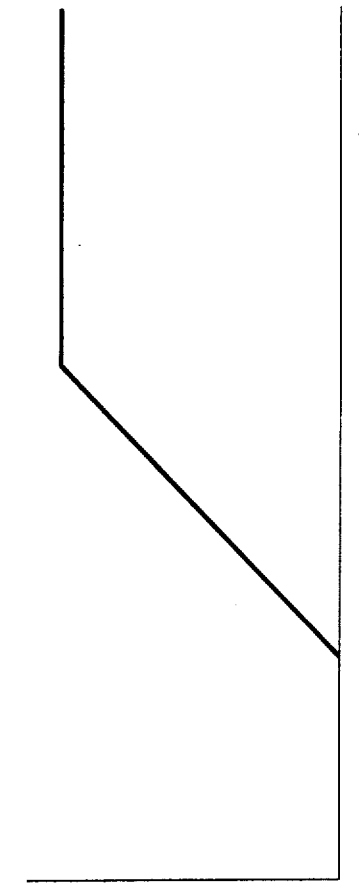
Figure 12:
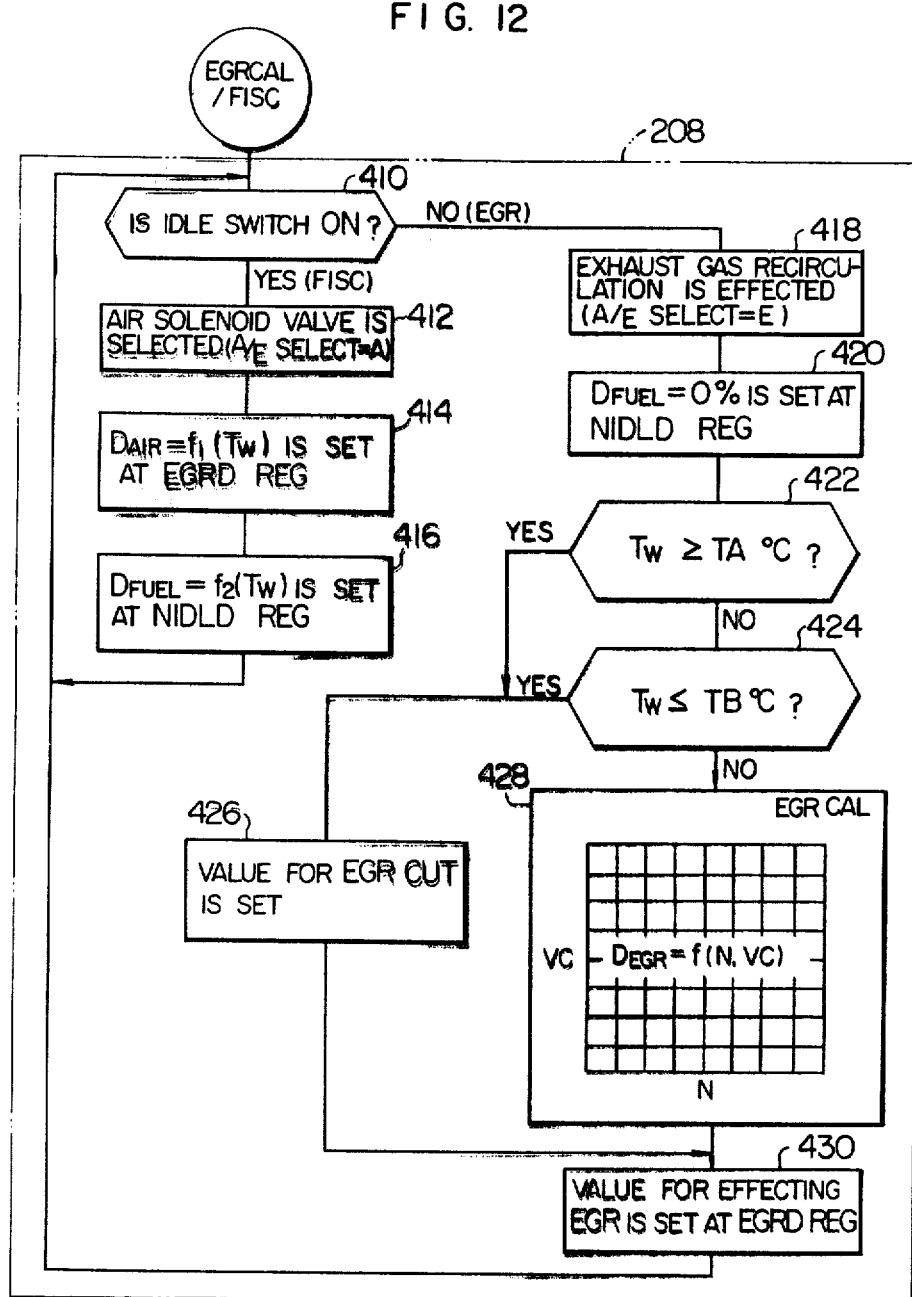
Figure 13:
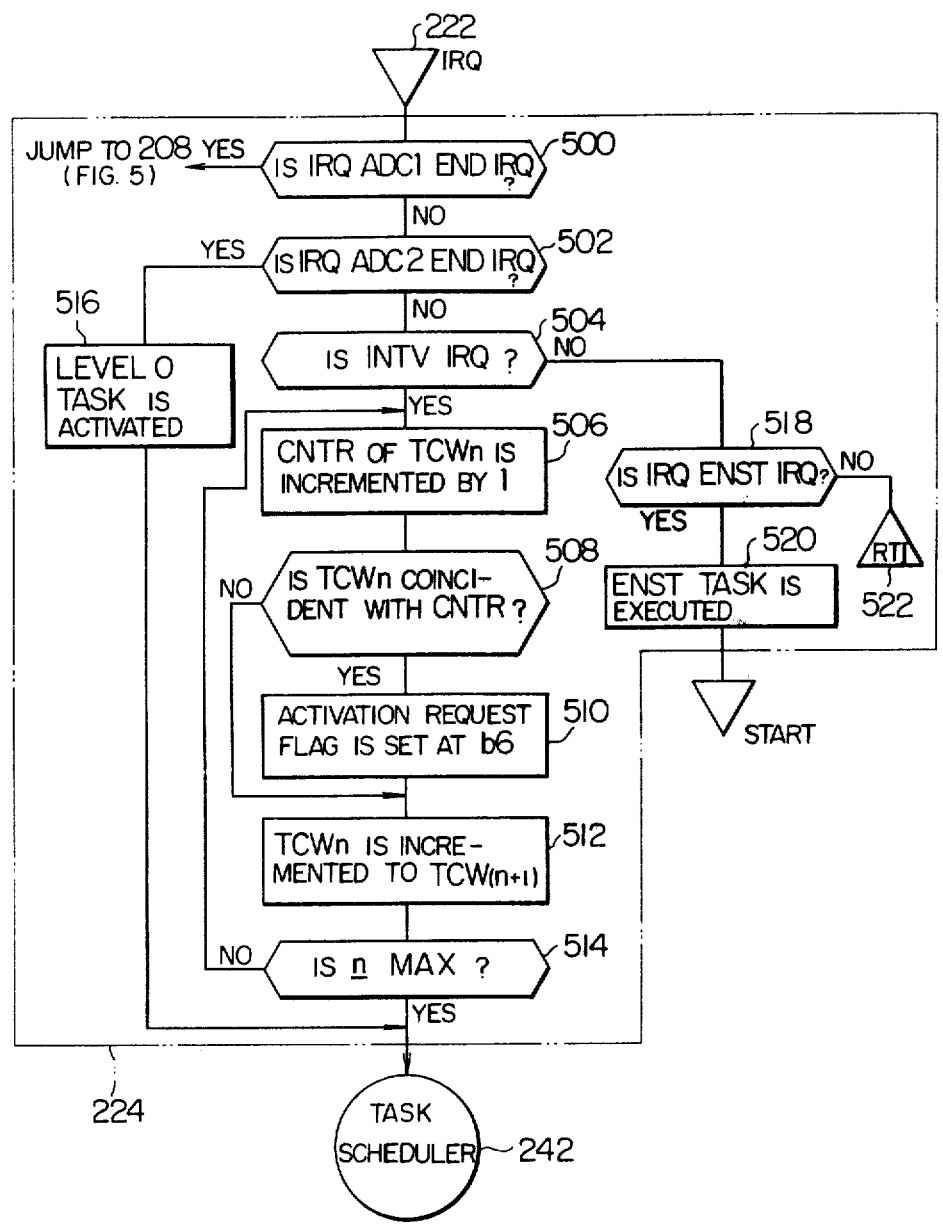
Figure 14:
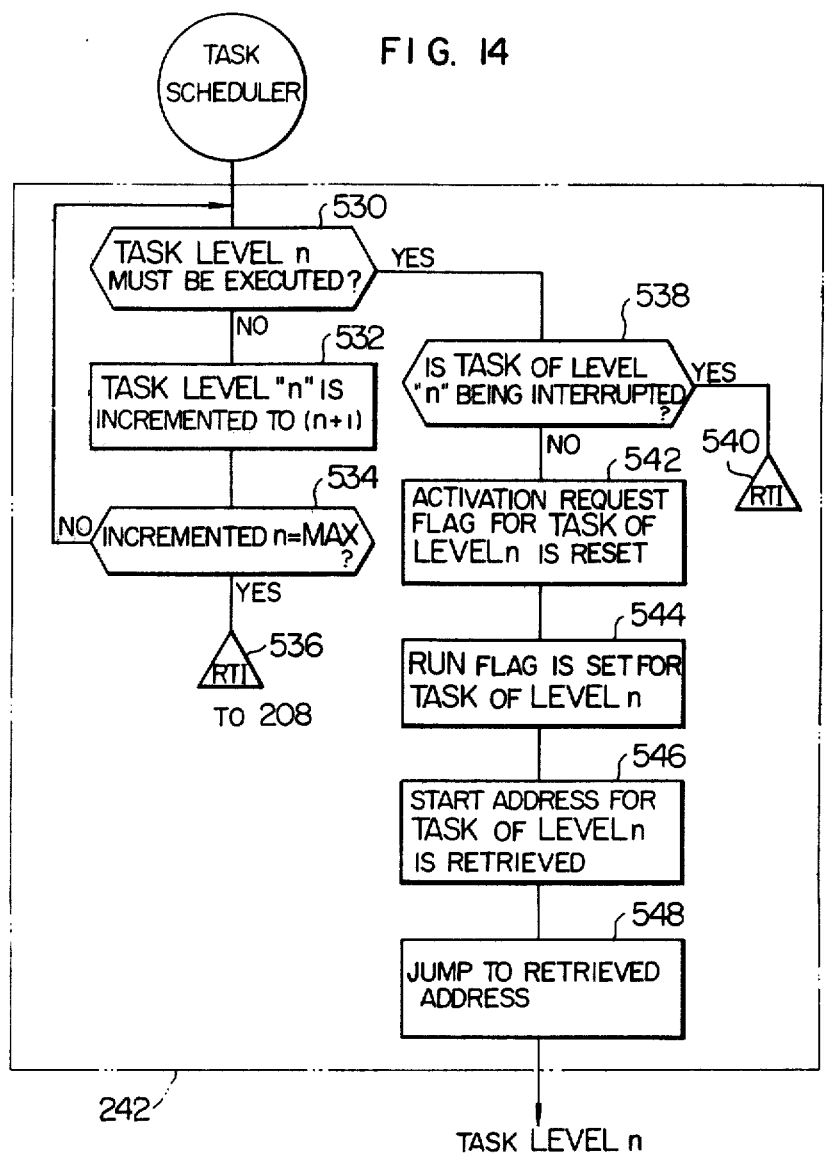
Figure 15:
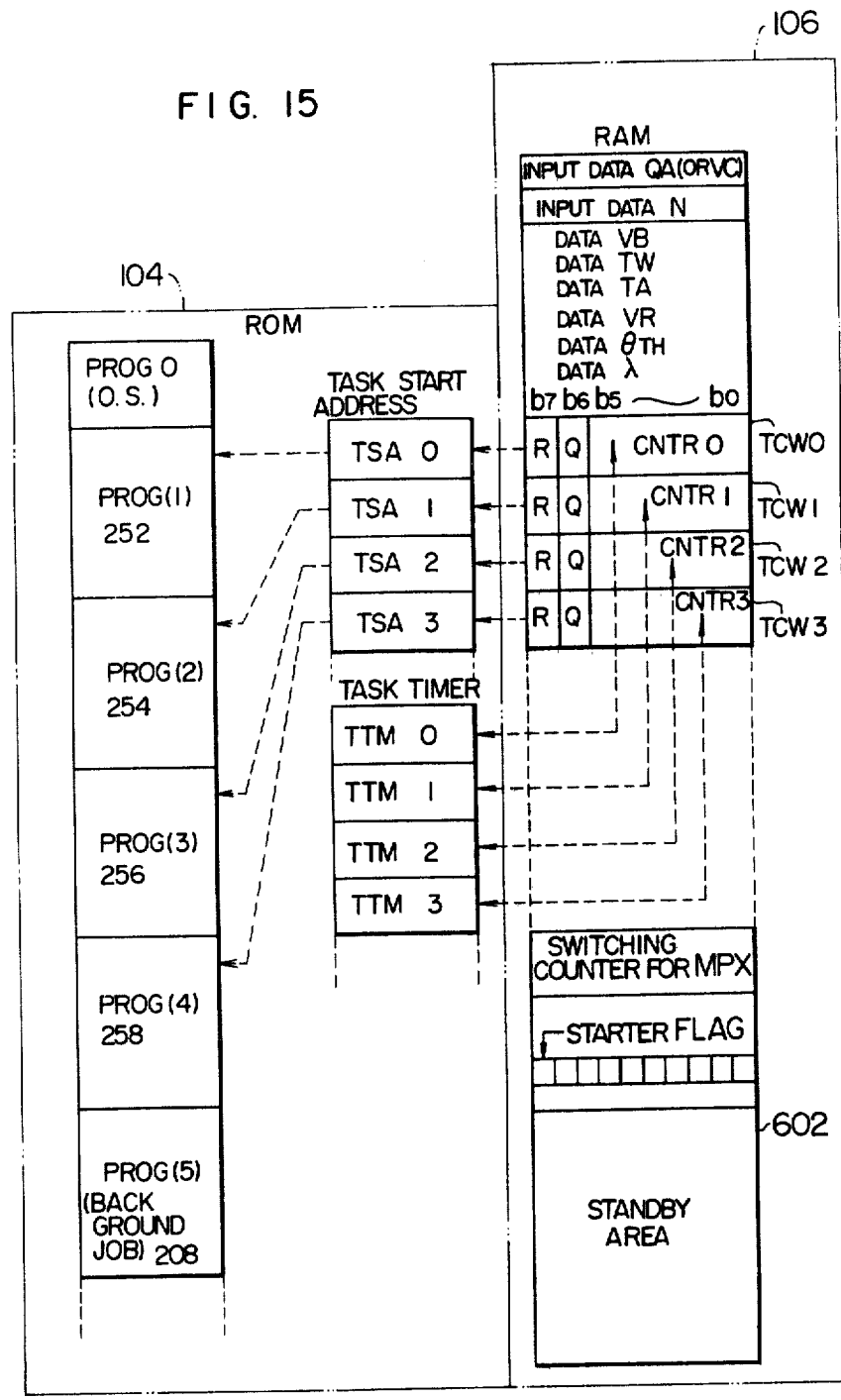
Figure 16:
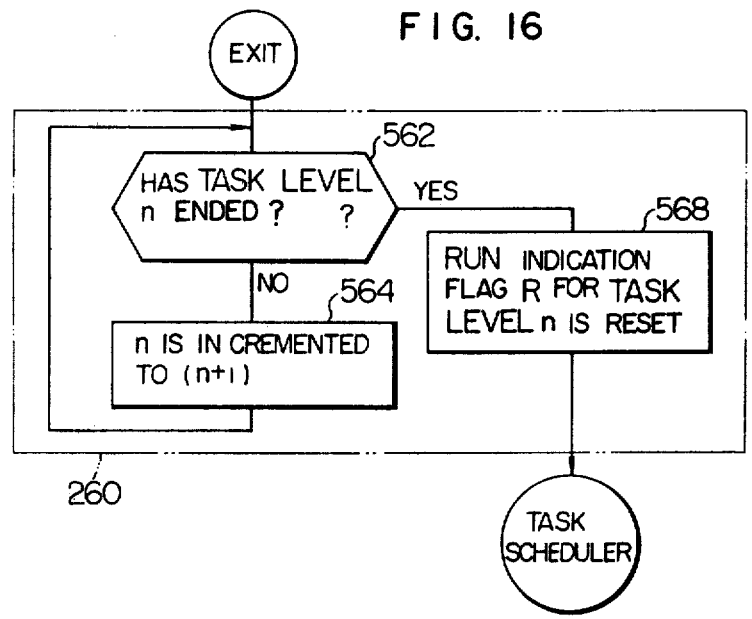
Figure 18:
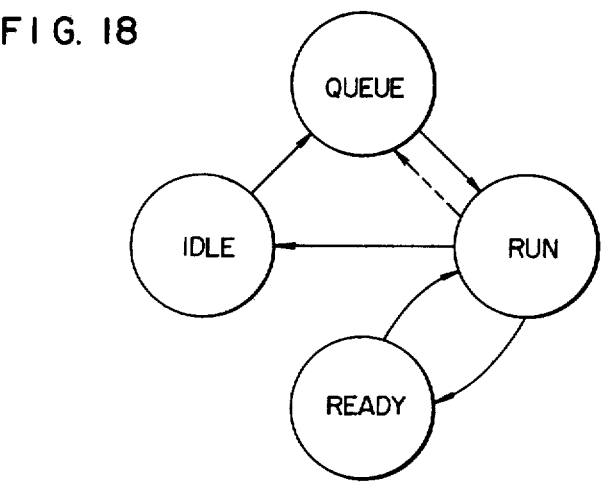
Figure 19:
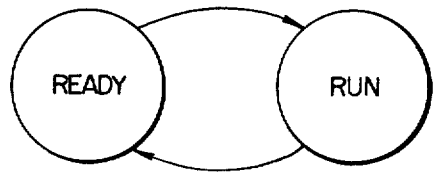
Figure 17:
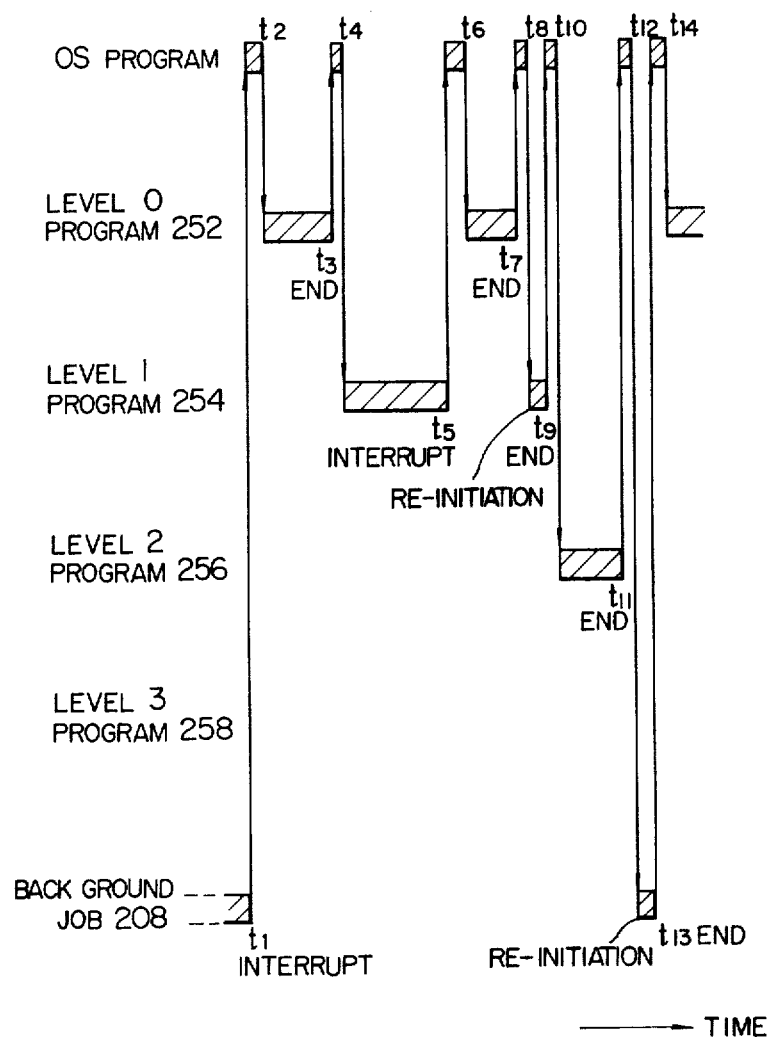
Figure 20:
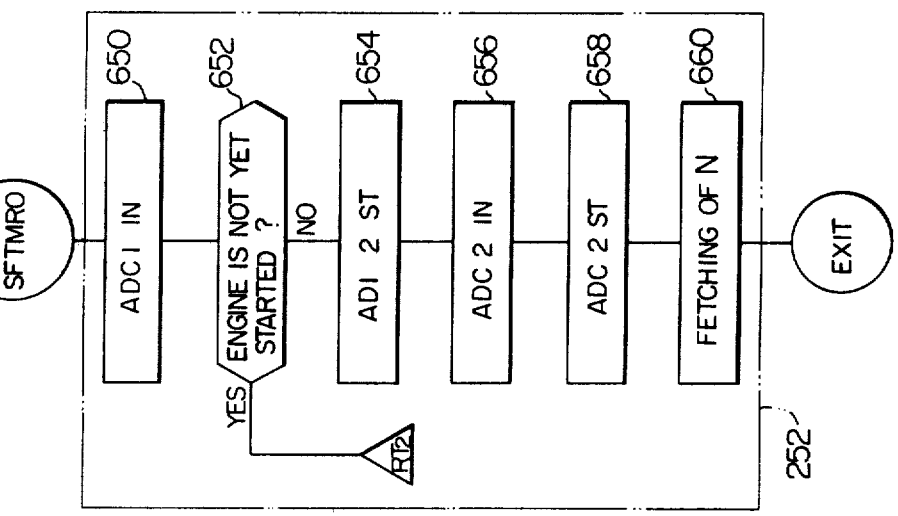
Figure 21:
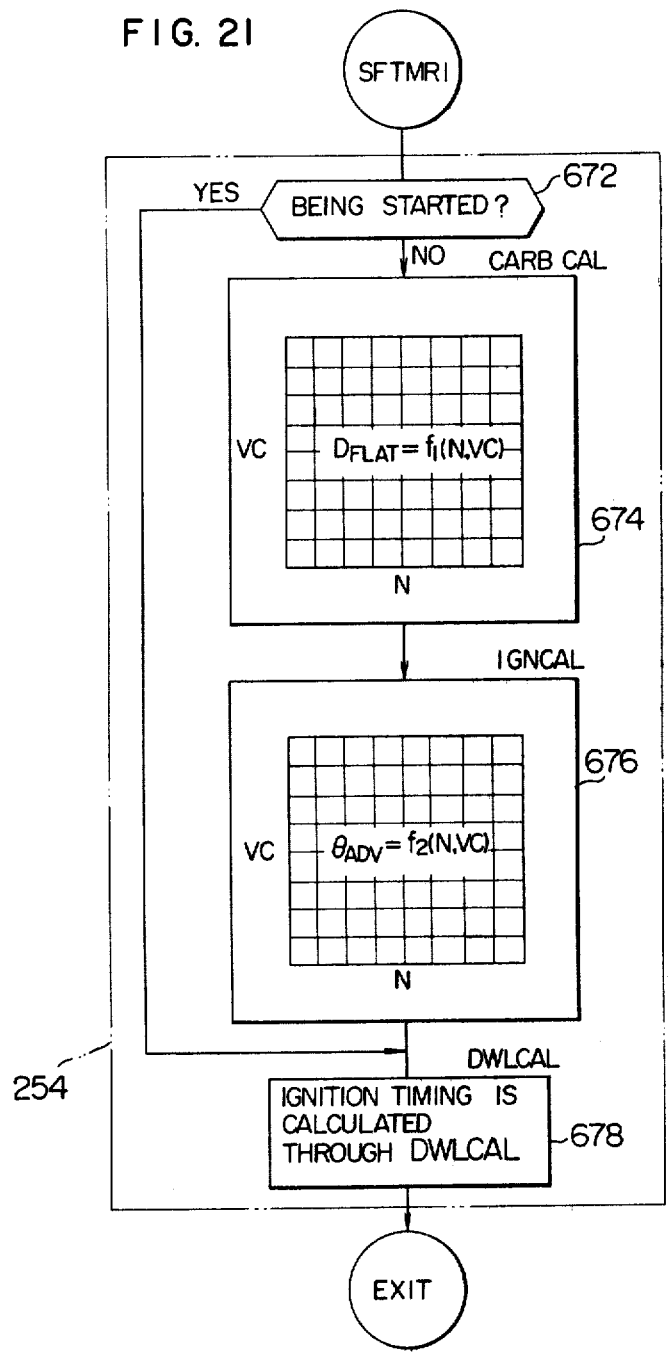
Figure 22:
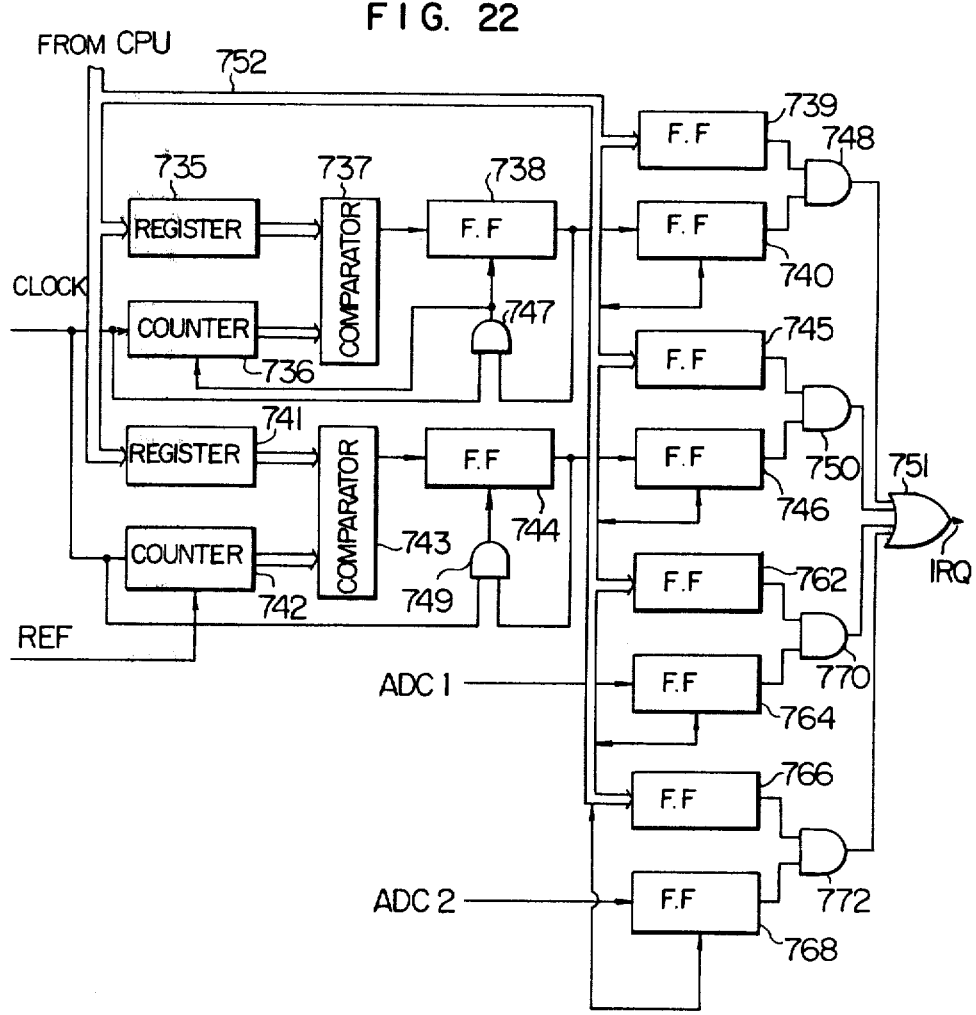

The above and other objects, features and advantages of the present invention will become more apparent from the following description taken in conjunction with the accompanying drawings, in which:

FIGS. 1 to 22 show a first embodiment of the present invention applied to an internal combustion engine provided with a carburetor, wherein FIG. 1 is a sectional view showing a throttle valve chamber of the engine, FIG. 2 shows schematically the arrangement of an ignition system, FIG. 3 illustrates schematically the arrangement of an exhaust gas recirculation system, FIG. 4 shows in a block diagram a general arrangement of the overall control system, FIG. 5 is a diagram illustrating a program system for the control circuit shown in FIG. 4, FIG. 6 shows the arrangement of a ROM to illustrate the program contents stored therein, FIG. 7 is a flow chart illustrating in detail an INITIALIZE program, FIG. 8 is a flow chart to illustrate details of a MONIT program, FIG. 9 graphically illustrates ignition timing for engine starting operation, FIG. 10 illustrates graphically a fuel supply characteristic for engine starting operation, FIG. 11 graphically illustrates an air supply characteristic for engine starting operation, FIG. 12 shows details of programs EGRCAL and FISC, FIG. 13 is a flow chart to illustrate details of a program 224 shown in FIG. 5, FIG. 14 is a flow chart to illustrate details of a task scheduler, FIG. 15 illustrates an operation for generating activation requests for task programs, FIG. 16 is a flow chart to illustrate details of an EXIT program, FIG. 17 illustrates a sequence for processing task programs of different levels, FIG. 18 illustrates changes in the state of a task program, FIG. 19 illustrates changes in the state of a background job program, FIG. 20 is a flow chart illustrating details of a program of level "0", FIG. 21 is a flow chart illustrating details of a program of level "1", FIG. 22 is a circuit diagram to show an IRQ generating circuit.

Figure 25:
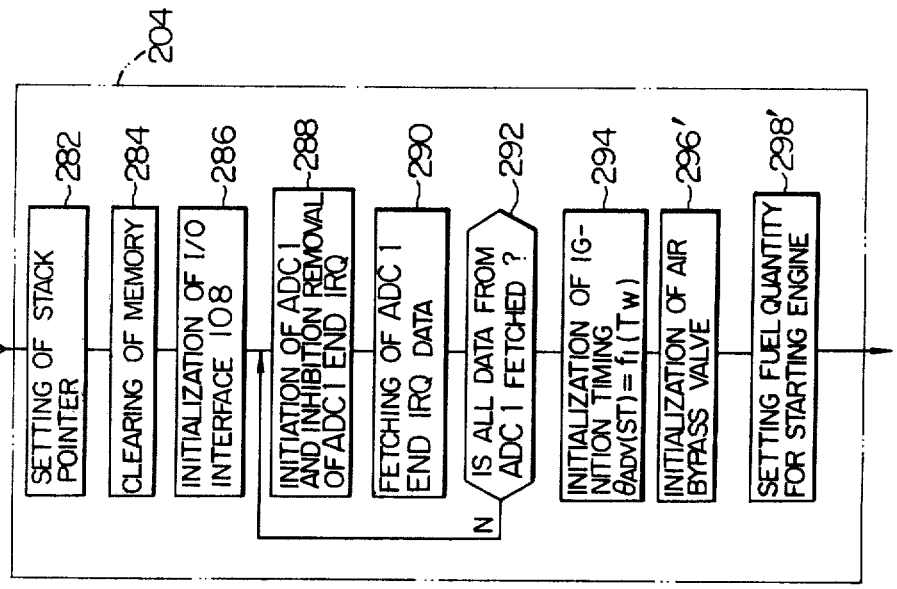
Figure 23:
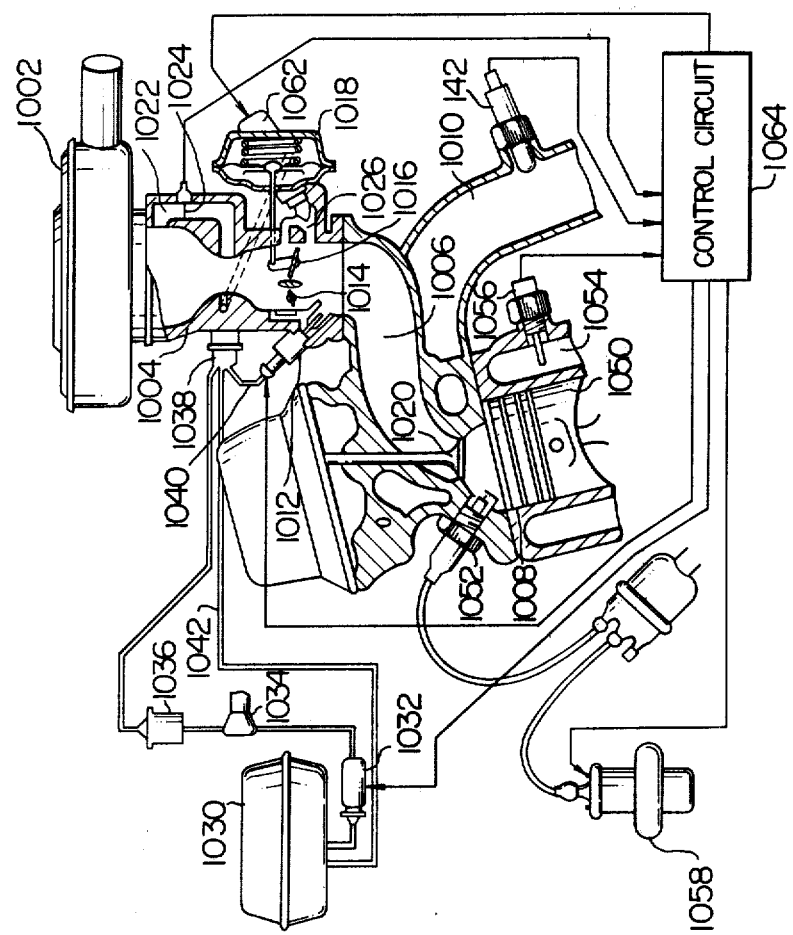
Figure 24:
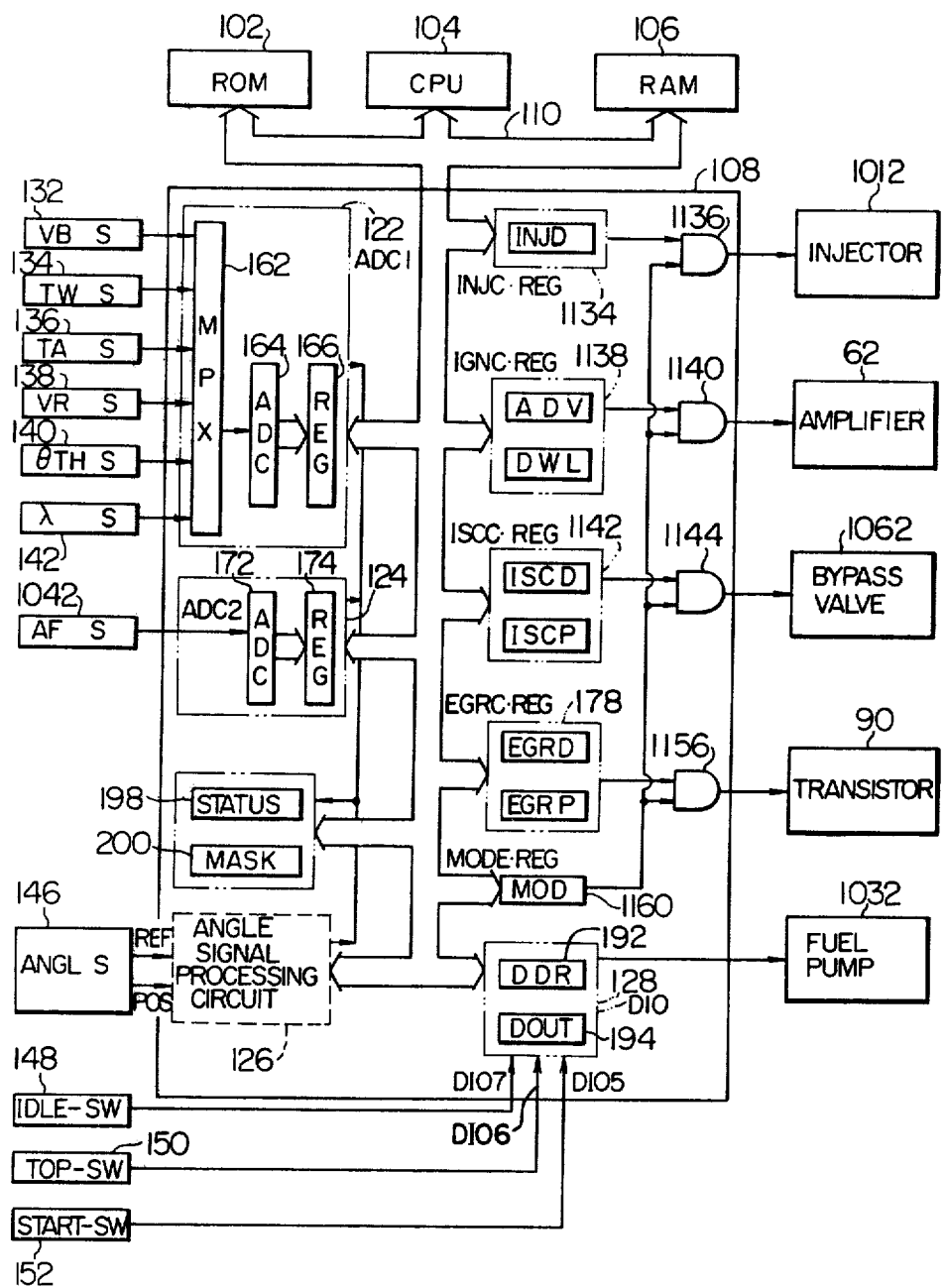
Figure 26:
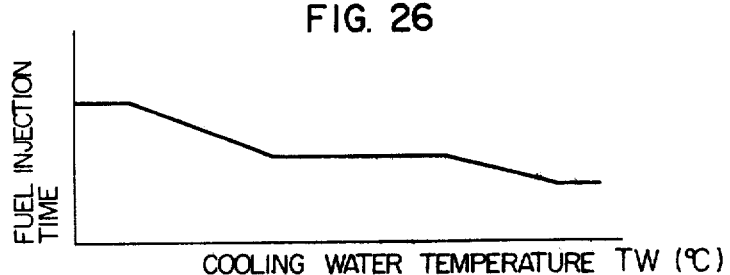
Figure 27:
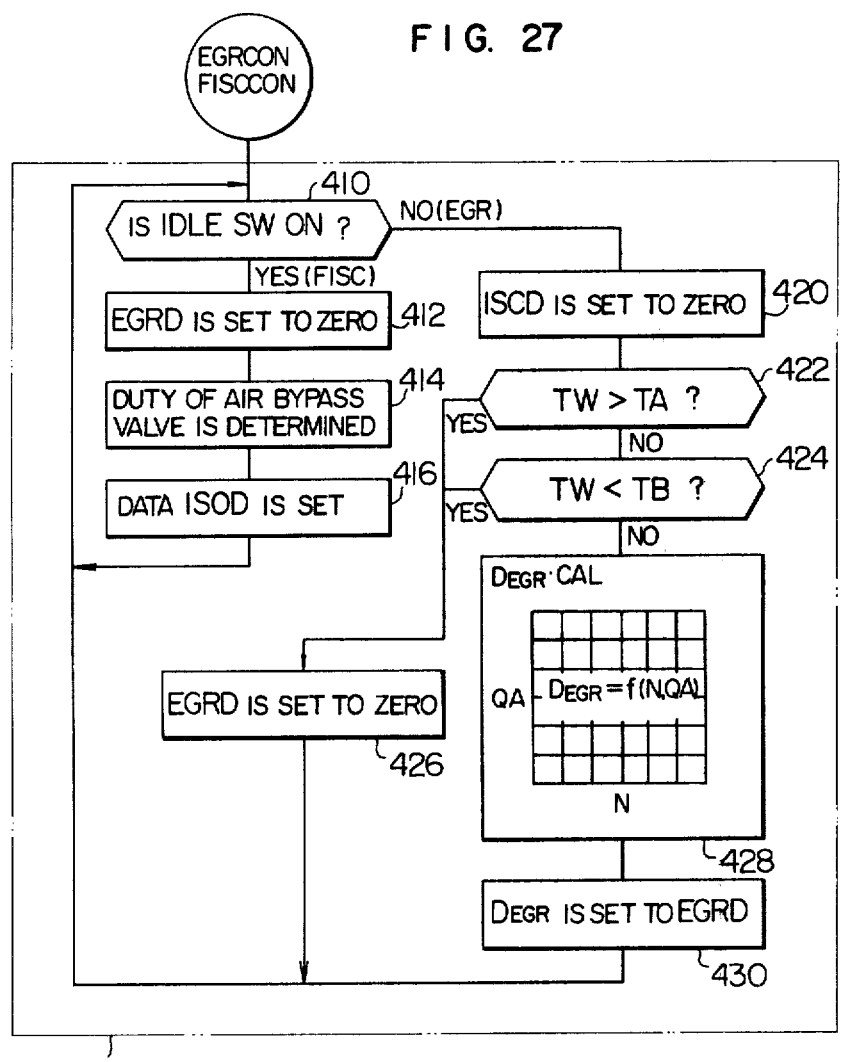
Figure 28:
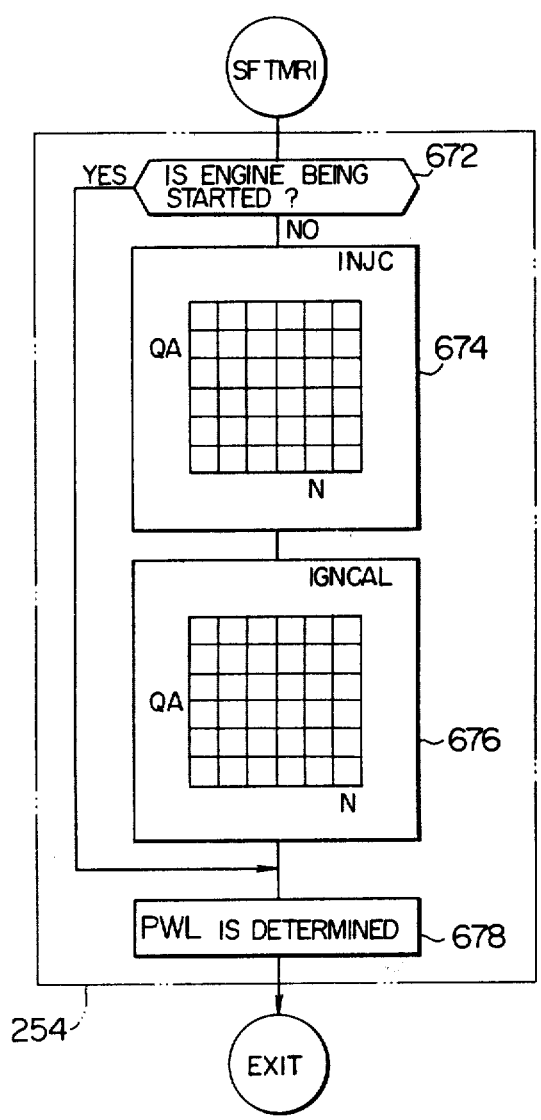
Figure 29:
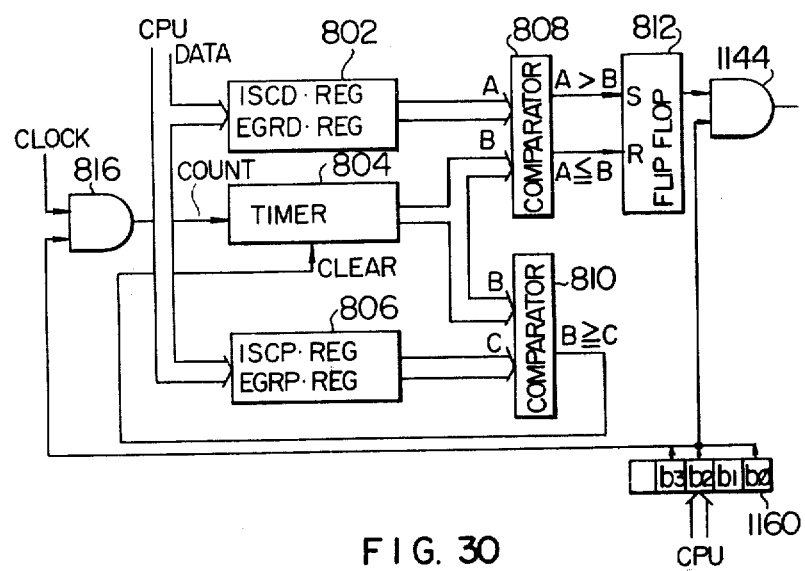
Figure 30:
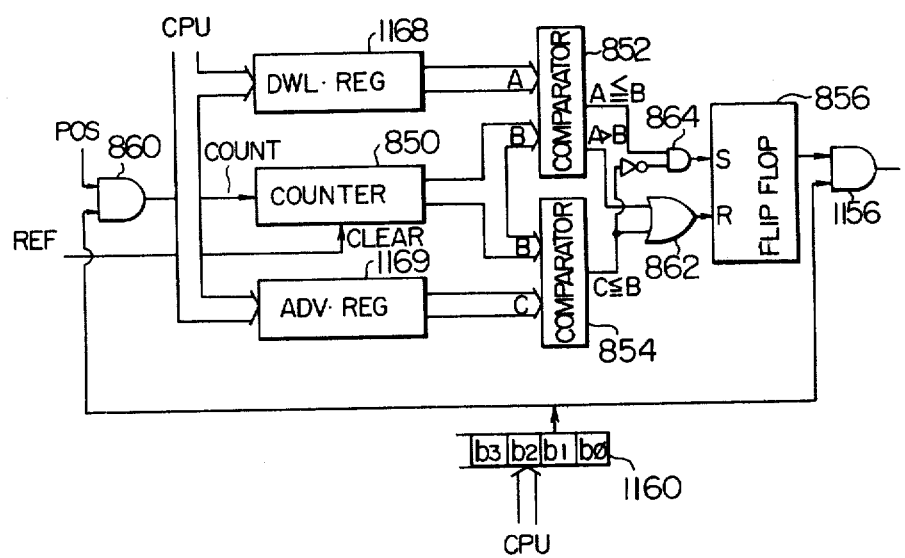

FIGS. 23 to 28 show a second embodiment of the present invention applied to an internal combustion engine of the fuel injection type, wherein FIG. 23 is a sectional view showing the general arrangement of an engine control system, FIG. 24 is a block diagram to show the general arrangement of the overall control system, FIG. 25 is a flow chart to illustrate details of an INITIALIZE program, FIG. 26 graphically shows a fuel supply characteristic for engine starting operation, FIG. 27 is a flow chart to illustrate details of a program of level "0", FIG. 28 is a flow chart to illustrate details of a program of level "1", FIG. 29 is a block diagram to illustrate circuits associated with a CABC register 162 and an FSC register 176 shown in FIG. 4, and an ISCC register and an EGRC register shown in FIG. 24, FIG. 30 is a block diagram showing a circuit associated with IGNC registers 168, 1138 respectively shown in FIGS. 4 and 24.

Figure 32:
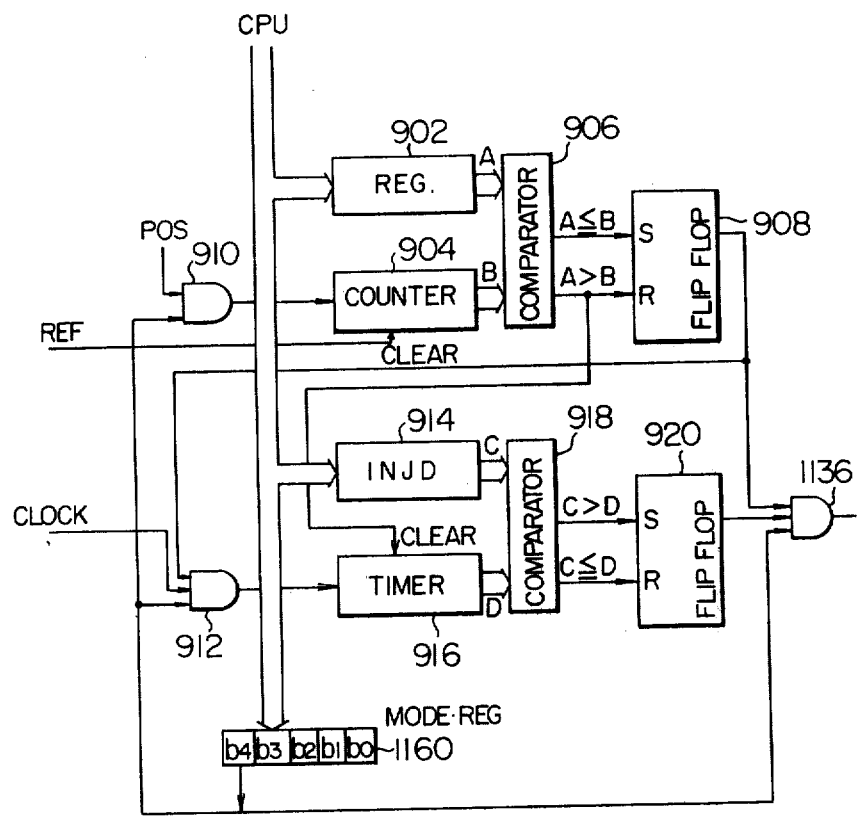

FIG. 31 is a circuit diagram showing in detail a circuit associated with a discrete input/output circuit DIO 128 shown in FIGS. 4 and 24, FIG. 32 is a circuit diagram showing in detail a circuit associated with an INJD register shown in FIG. 24, and FIG. 33 is a signal waveform diagram to illustrate the operation of the circuit shown in FIG. 32.

Now, the invention will be described in conjunction with a first exemplary embodiment thereof applied to an internal combustion engine provided with a carburetor by referring to FIGS. 1 to 22.

FIG. 1 is a sectional view showing a throttle chamber of an internal combustion engine. Various solenoid valves are provided around the throttle chamber for controlling a fuel quantity and a bypass air flow supplied to the throttle chamber, as will be described below.

The opening of a throttle valve 12 for a low speed operation is controlled by an acceleration pedal (not shown), whereby the air flow supplied to individual cylinders of the engine via an air cleaner (not shown) is controlled. When the air flow passing through a Venturi 34 for the low speed operation is increased as the result of the increased opening of the throttle valve 12, a throttle valve 14 for a high speed operation is opened through a diaphragm device (not shown) in dependence on a negative pressure produced at the Venturi for the low speed operation, resulting in a decreased air flow resistance which would otherwise be increased due to the increased intake air flow.

The quantity of air flow fed to the engine cylinders under the control of the throttle valves 12 and 14 is detected by a negative pressure sensor (not shown) and converted into a corresponding analog signal. In dependence on the analog signal thus produced as well as other signals available from other sensors which will be described hereinafter, the opening degrees of various solenoid valves 16, 18, 20 and 22 shown in FIG. 1 are controlled.

Next, description will be presented for the control of the fuel supply. The fuel fed from a fuel tank through a conduit 24 is introduced into a conduit 28 through a main jet orifice 26. Additionally, fuel is introduced into the conduit 28 through a main solenoid valve 18. Consequently, the fuel quantity fed to the conduit 28 is increased as the opening degree of the main solenoid valve 18 is increased. Fuel is then fed to a main emulsion tube 30 to be mixed with air and supplied to the Venturi 34 through a main nozzle 32. At the time when the throttle valve 14 for high speed operation is opened, fuel is additionally fed to a Venturi 38 through a nozzle 36. On the other hand, a slow solenoid valve (or idle solenoid valve) 16 is controlled simultaneously with the main solenoid valve 18, whereby air supplied via the air cleaner is introduced into a conduit 42, through an inlet port 40. Fuel fed to the conduit 28 is also supplied to the conduit or passage 42 through a slow emulsion tube 44. Consequently, the quantity of fuel supplied to the conduit 42 is decreased as the quantity of air supplied through the slow solenoid valve 16 is increased. The mixture of air and fuel produced in the conduit 42 is then supplied to the throttle chamber through an opening 46 which is also referred to as the slow hole.

The fuel solenoid valve 20 serves to increase the fuel quantity for the engine starting and warming-up operations. Fuel introduced through a hole 48 communicating with the conduit 24 is fed to a conduit 50 communicating with the throttle chamber in dependence on the opening degree of the fuel solenoid valve 20.

The air solenoid valve 22 serves to control the air quantity supplied to the engine cylinders. To this end, the air solenoid valve 22 is supplied with air via the air cleaner through an opening 52, whereby air is introduced into a conduit 54 opening in the throttle chamber in a quantity corresponding to the opening degree of the air solenoid value.

The slow solenoid valve 16 cooperates with the main solenoid valve 18 to control the fuel-air ratio, while the fuel solenoid valve 20 functions to increase the fuel quantity. Further, the engine speed at the idling operation is controlled through cooperation of the slow solenoid valve 16, the main solenoid valve 18 and the air solenoid valve 22.

Referring to FIG. 2 which shows schematically the arrangement of the ignition system, pulse current is supplied to a power transistor 64 through an amplifier circuit 62, as the result of which the power transistor 64 is turned on (i.e. becomes conductive), whereby a primary current is caused to flow through a primary winding of an ignition coil 68 from a battery 66. In response to the trailing edge of the current pulse, the transistor 64 is turned off (i.e. non-conductive or blocked), to give rise to induction of a high voltage in a secondary winding of the ignition coil 68.

The high voltage thus produced is then supplied to spark plugs 72 of the individual cylinders of the internal combustion engine through a distributor 70 in synchronism with the rotation of the engine crankshaft.

FIG. 3 is a diagram to illustrate the operation of an exhaust gas recirculating system (hereinafter referred to simply also as EGR system). A constant negative pressure derived from a constant negative pressure source 80 is applied to a control valve 86 through a constant-pressure valve i.e. pressure controlling valve 84 which serves to control the ratio at which the constant negative pressure from the negative pressure source 80 escapes to the atmosphere 88 in dependence on the duty cycle of a pulse signal applied to a transistor 90, to thereby control the negative pressure level applied to the control valve 86. In other words, the negative pressure applied to the control valve 86 is determined on the basis of the duty cycle of the transistor 90. On the other hand, the quantity of recirculated exhaust gas from an exhaust conduit 92 to an intake conduit 82 is controlled by the control negative pressure applied from the constant pressure valve 84.

FIG. 4 shows, in a schematic diagram form, a general arrangement of the overall control system. The control system includes a central processing unit (hereinafter referred to as CPU) 102, a read-only memory (hereinafter referred to as ROM) 104, a random access memory (hereinafter referred to as RAM) 106, and an input/output interface circuit 108. The CPU 102 performs arithmetic operations for input data from the input/output circuit 108 in accordance with various programs stored in ROM 104 and feeds the results of the arithmetic operation back to the input/output circuit 108. Temporary data storage as required for executing the arithmetic operations is accomplished by using the RAM 106. Various data transfers or exchanges among the CPU 102, ROM 104, RAM 106 and the input/output circuit 108 are realized through a bus 110 composed of a data bus, a control bus and an address bus.

The input/output interface circuit 108 includes input means constituted by a first analog-to-digital converter 122 (hereinafter referred to as ADC1), a second analog-to-digital converter 124 (hereinafter referred to as ADC2), an angular signal processing circuit 126, and a discrete input/output circuit 128 (hereinafter referred to as DIO) for inputting or outputting a single-bit information.

The ADC1 122 includes a multiplexer 162 (hereinafter referred to as MPX) which has input terminals supplied with output signals from a battery voltage detecting sensor 132 (hereinafter referred to as VBS), a sensor 134 for detecting temperature of cooling water (hereinafter referred to as TWS), an ambient temperature sensor 136 (hereinafter referred to as TAS), a regulated-voltage generator sensor 138 (hereinafter referred to as VRS), a sensor 140 for detecting a throttle angle (hereinafter referred to as θTHS) and a λ-sensor 142 (hereinafter referred to as λS). The multiplexer or MPX 162 selects one of the input signals and couples the selected input signal to an analog-to-digital converter circuit 164 (hereinafter referred to as ADC). The digital signal output from the ADC 164 is stored in a register 166 (hereinafter referred to as REG).

The output signal from a negative pressure sensor 144 (hereinafter referred to as VCS) is supplied to the input of ADC2 124 to be converted into a digital signal through an analog-to-digital converter circuit (hereinafter referred to as ADC) 172. The digital signal output from the ADC 172 is stored in a register (hereinafter referred to as REG) 174.

An angle sensor 146 (hereinafter termed ANGS) is adapted to produce a signal representative of a standard or reference crank angle, e.g. of 180° (this signal will be hereinafter termed REF signal) and a signal representative of a minute crank angle (e.g. 1°) which signal will be hereinafter referred to as POS signal. Both of the signals REF and POS are applied to the angular signal processing circuit 126 to be shaped.

The discrete input/output circuit or DIO 128 has respective inputs DIO7-DIO5 connected to an idle switch 148 (hereinafter referred to as IDLE-SW), a top-gear switch 150 (hereinafter termed TOP-SW) and a starter switch 152 (hereinafter referred to as START-SW).

Next, description will be given of a pulse output circuit as well as objects or functions to be controlled on the basis of the results of arithmetic operations executed by CPU 102. A fuel-air ratio control device 165 (hereinafter referred to as CABC) serves to vary the duty cycle of a pulse signal supplied to the slow solenoid valve 16 and the main solenoid valve 18 for the control thereof. Since an increase in the duty cycle of the pulse signal through control by CABC 165 must involve a decrease in the fuel supply quantity through the main solenoid valve 18, the output signal from CABC 165 is applied to the main solenoid valve 18 through an inverter 163. On the other hand, the fuel supply quantity controlled through the slow solenoid valve 16 is increased, as the duty cycle of the pulse signal produced from the CABC 165 is increased. The CABC 165 includes a register (hereinafter referred to as CABP) for storing therein the pulse repetition period of the pulse signal described above and a register (hereinafter referred to as CABD) for storing therein the duty cycle of the same pulse signal. Data for the pulse repetition period and the duty cycle to be loaded in these registers CABP and CABD are available from the CPU 102.

An ignition pulse generator circuit 168 (hereinafter referred to as IGNC) is provided with a register (hereinafter referred to as ADV) for storing therein ignition timing data and a register (hereinafter referred to as DWL) for controlling a duration of the primary current flowing through the ignition coil. Data for these controls are available from the CPU 102. The output pulse from the IGNC 168 is applied to the ignition system denoted by 170 in FIG. 4. The ignition system 170 is implemented in such arrangement as described hereinbefore by referring to FIG. 2. Accordingly, the output pulse from the IGNC 168 is applied to the input of the amplifier circuit 62 shown in FIG. 2.

A fuel increasing pulse generator circuit 176 (hereinafter referred to as FSC) serves to control the duty cycle of a pulse signal applied to the fuel solenoid valve 20 shown in FIG. 1 for the control thereof and includes a register for storing therein the pulse repetition period of the pulse signal (this register will be hereinafter referred to as FSCP) and a register (hereinafter referred to as FSCD) for storing the duty cycle of the same pulse signal.

A pulse generator circuit 178 (hereinafter referred to as EGRC) for producing a pulse signal to control the quantity of exhaust gas to be recirculated (EGR) includes a register (hereinafter termed EGRP) for storing the pulse repetition period and a register (hereinafter termed EGRD) for storing the duty cycle of the pulse signal which is supplied to the air solenoid valve 22 through an AND gate 184 having the other input supplied with the output signal DIO1 from the DIO 128. More specifically, when the signal DIO1 is at a level "L", the AND gate 184 is enabled, to conduct therethrough the control pulse signal for controlling the air solenoid valve 22.

On the other hand, when the signal DIO1 is at a level "H", an AND gate 186 is enabled to control the EGR system 188, the fundamental construction of which is illustrated in FIG. 3.

The DIO 128 is an input/output circuit for a single bit signal as described hereinbefore and includes to this end a register 192 (hereinafter referred to as DDR) for storing data to determine the output or input operation, and a register 194 (hereinafter referred to as DOUT) for storing data to be output. The DIO 128 produces an output signal DIO0 for controlling the fuel pump 190.

FIG. 5 illustrates a program for the control circuit shown in FIG. 4. When a power supply source is turned on by a key switch (not shown), the CPU 102 is set in a start mode to execute an initialization program (INITIALIZE). Subsequently, a monitor program (MONIT) 206 is executed, which is followed by execution of background jobs (BACKGROUND JOB) 208. The background jobs include, for example, a task for calculating the quantity of EGR (hereinafter referred to as EGR CAL. task) and a task for calculating the control quantities for the fuel solenoid valve 20 and the air solenoid valve 22 (hereinafter referred to as FISC). When an interrupt request (hereinafter termed IRQ) occurs during the execution of these tasks, an IRQ analyzing program 224 (hereinafter termed IRQ ANAL) is executed beginning with step 222. The program IRQ ANAL is constituted by an end interrupt processing program 226 for the ADC1 (hereinafter referred to as ADC1 END IRQ), an end interrupt processing program 228 for the ADC2 (hereinafter referred to as ADC2 END IRQ) and an interval interrupt processing program 230 (hereinafter referred to as INTV IRQ), and an engine stop interrupt processing program 232 (hereinafter referred to as ENST IRQ) and issues activation requests (hereinafter referred to as QUEUE) to the tasks to be activated among those described below.

The tasks to which the request QUEUE is issued from the subprograms ADC1 END IRQ 226, ADC2 END IRQ 228 and INTV IRQ 230 of the program IRQ ANAL 224 are a task group 252 of level "0", a task group 254 of level "1", a task group 256 of level "2" or a task group 258 of level "3" or, alternatively, given individual tasks which constitute parts of these task groups. The task to which the request QUEUE is issued from the program ENST IRQ 232 is a task program 262 for processing the stopping of the engine (this task will be hereinafter referred to as ENST TASK). When the task program ENST TASK 262 has been executed, the control program is returned to the start mode and the start step 202 is reinitiated.

A task scheduler 242 serves to determine the sequence in which the task groups are executed such that the task groups to which the request QUEUE is issued or execution of which is interrupted are executed starting from the task group of the highest level. In the case of the illustrated example, it is assumed that the level "0" is the highest level. Upon completing execution of the task group of the highest level, a termination indicating program 260 (hereinafter referred to as EXIT) is executed to inform this fact to the task scheduler 242. Subsequently, the task group of the next highest level among those in queue is executed and so forth.

When there remains no task group the execution of which is interrupted or to which the request QUEUE is issued, execution of the background jobs 208 is resumed under the command of the task scheduler 242. Further, when IRQ is issued during execution of the task group among those of level "0" to "3", the starting step 222 of the IRQ processing program is reinitiated.

The identities and functions of the individual task programs are listed in Table 1.

TABLE 1

| Level | Identification of programs | Functions | Activation (Timing) |
|---|---|---|---|
| — | IRQ ANAL | Analysis of IRQ and issue of requests for activating task groups or tasks | IRQ |
| — | TASK SCHEDULER | Determination of task groups or tasks to be executed | End of IRQ ANAL or end of EXIT |
| — | EXIT | Informing of ended executions of task groups | End of individual task groups |
| | AD1IN | Fetching of output from ADC1 | INTV IRQ (10m . sec) or ADC1END |
| | AD1ST | Initiation of ADC1 | INTV IRQ (10m . sec) |
| 0 | AD2IN | Fetching of output from ADC2 | INTV IRQ (10m . sec) or ADC2 END |
| | AD2ST | Initiation of ADC2 | INTV IRQ (10m . sec) |
| | RPMIN | Fetching of engine speed | INTV IRQ (10m . sec) |
| 1 | CARBC | Calculation of duty cycle for controlling fuel-air ratio | INTV IRQ (20m . sec) |
| | IGNCAL | Calculation of ignition timing | INTV IRQ (20m . sec) |
| 1 | DWLCAL | Calculation of duration of primary current through ignition coil | INTV IRQ (20m . sec) |
| 2 | LAMBDA | Control of λ | INTV IRQ (40m . sec) |
| 3 | HOSEI | Calculation of corrections | INTV IRQ (100m . sec) |
| — | FISC | Calculation for positioning fuel valve and air valve | BACKGROUND JOB |
| — | EGRCAL | Calculation for positioning negative-pressure-controlled valve for EGR | BACKGROUND JOB |
| — | INITIALIZE | Setting initial values at input/output circuit | START or RE-START |
| — | MONIT | Monitoring of START-SW and starting of fuel pump | START or RE-START |
| — | ENST TASK | Stop of fuel pump and resetting of IGN | ENST IRQ |

As can be seen from the above Table 1, there are programs for monitoring or supervising the control system illustrated in FIG. 5 such as programs IRQ ANAL, TASK SCHEDULER and EXIT. These programs are held in ROM 104 at addresses A000 to A2FF, as illustrated in FIG. 6.

As the program of level "0", there are AD1IN, AD1ST, AD2IN, AD2ST and RPMIN which are activated usually by INTV IRQ produced every 10 m.sec.

Programs of level "1" include CARBC, IGNCAL and DWLCAL programs which are activated for every INTV IRQ that is produced periodically at time intervals of 20 m.sec. As the program of level "2", there is LAMBDA which is activated by an INTV IRQ produced every 40 m.sec. The program of level "3" is HOSEI which is activated by an INTV IRQ produced every 100 m.sec. The programs EGRCAL and FISC are for the background jobs. The programs of level "0" are stored in ROM 104 at addresses A700 to AAFF as PROG1, as shown in FIG. 6. The level "1" programs are stored in ROM 104 at addresses AB00 to ABFF as PROG2. The level "2" programs are stored in ROM 104 at address AE00 to AEFF as PROG3. The program of level "3" is stored in ROM 104 at addresses AF00 to AFFF as PROG4. The program for the background jobs is stored at addresses B000 to B1FF. A list (hereinafter referred to as SFTMR) of the start address of the programs PROG1 to PROG4 described above is stored at addresses B200 to B2FF, while values representative of the activation periods of the individual programs (hereinafter referred to as TTM) are stored at addresses B300 to B3FF.

Other data as required are stored in ROM 104 at addresses B400 to B4FF, as is illustrated in FIG. 6. In succession thereto, data ADV MAP, AF MAP and EGR MAP are stored at B500 to B7FF.

The program INITIALIZE shown at 204 in FIG. 5 will be described in detail by referring to FIG. 7. At a step 282, a standby area is set upon issuing of IRQ. Next, at a step 284, RAM 196 is cleared. At a step 286, the registers of the input/output circuit 108 are initialized (i.e. loaded with initial values). This initialization step includes the setting of the number of engine cylinders, initial value of the angle sensor, setting of DDR of DIO 128, setting of a timer for issuing INTV IRQ, the setting of detection period for issuing of ENST IRQ, and the setting of measuring time for detecting engine speed.

At a step 228, ADC1 is triggered, while the inhibiting of END IRQ for ADC1 is removed. In this case, a jump is made to the address A700 shown in FIG. 6 which is the start address of a program AD1ST. As the consequence, the output signal from VBS (battery voltage detecting sensor) 132 which constitutes one of the inputs to MPX 162 of the ADC1 122 shown in FIG. 4 is selected and applied to the input of the ADC 164. At a step 290, issuance of END IRQ for ADC 164 is awaited. When the digital value output from ADC 164 upon completion of the operation thereof is loaded into REG 166, a signal representative of the termination of the operation of ADC 164 is supplied to the status register STATUS 198 and ADC1 END IRQ is transferred to CPU 102. As a consequence, the program AD1 IN is executed, whereby the output from the battery voltage detecting sensor 132 is fetched or sampled.

At a step 292, the program determines whether all the output values from the sensors 132 to 142 have been fetched. Since only the fetching of the output signal from the sensor 132 has been completed in this case, the routine is returned to the step 288, at which the program AD1ST is again started, whereby MPX 162 selects the output from the sensor 134 as the next input thereto. Upon completion of the analog-to-digital conversion of the output signal from the sensor 134, the program AD1IN (fetching) is executed at a step 292, whereby the digital value representative of the output from TWS (temperature sensor for coolant water) 134 held in the register or REG 166 is read out and stored at DATA area. At a step 292, the routine is returned to the step 288. In this manner, through repetitive execution of the steps 288 to 292 in a looped routine, the digital values representing the outputs from the sensors 132 to 142, respectively, are successively fetched. When the output value of the λ-sensor 142 has been fetched, the program proceeds to a step 294.

At the step 294, the ignition timing for starting the engine is arithmetically determined. To this end, the ignition timing $\theta$ADV(ST) is arithmetically determined as a function of the temperature TW of the engine cooling water. The relationship between the ignition timing for starting the engine and the cooling water temperature is graphically illustrated in FIG. 9. In accordance with the characteristic relationship illustrated in FIG. 9, the ignition timing ADV(ST) is arithmetically determined. The results as obtained are loaded in the register ADV of IGNC 168 shown in FIG. 4.

At a step 296, the opening degree of the air solenoid valve 22 for starting the engine is arithmetically determined as a function of the temperature of cooling water, as is graphically illustrated in FIG. 11. The results of the executed arithmetic operation are placed in the register EGRD. A fixed value for the opening degree of the air solenoid valve is set at the register EGRP. In FIG. 11, the valve opening degree of the air solenoid valve 22 for starting the engine is taken along the ordinate in terms of ratio to the fixed value stored in EGRP.

At a step 298, the initial value for the duty factor of the fuel solenoid valve 20 is arithmetically determined on the basis of a relationship to the temperature of cooling water which relationship is graphically illustrated in FIG. 10 in terms of the ratio of the value set at the register FSCD to the value set at the register FSCP. When data is placed in the registers FSCP and FSCD, the execution of the program INITIALIZE 204 in FIG. 5 has been completed, which is then followed by the execution of the MONIT program 206 illustrated in FIG. 8.

The program MONIT 206 is started from a step 302 at which the program determines whether the starter switch 152 shown in FIG. 4 is closed by monitoring the input of DIO5 of DIO 128. When the starter switch 152 is in the closed or ON-state, the fifth bit DIO5 in the register DIO 128 is at the level "H". On the other hand, when the starter switch 152 is opened, the same bit is at the level "L". Assuming that the starter motor is not yet energized, the starter switch 152 is opened. Consequently, the MONIT program proceeds from the step 302 to the step 312 at which the program determines whether the starter motor is in operation by checking whether a start flag is set or not. This start flag is stored in RAM at a predetermined location, as is illustrated in FIG. 15 and set at a step 308. Since the starter flag is not set before the initiation of the starter motor, the result of the decision step 312 is negative or "NO" at this time, whereby the program returns again to the step 302. In this manner, execution of the program is circulated between the steps 302 and 312 as long as the starter switch 152 remains opened, while the state of the starter switch is simultaneously monitored.

When the starter switch 152 is turned on or closed, the result of the decision step 302 is affirmative or "YES". The program then proceeds to a step 304 at which the program determines whether the engine has been started. Since the decision step 304 at the first time immediately follows the detection of the closed state of the starter switch, the decision at the step 304 will result in "NO". The decision at the step 304 is made also by checking whether the starter flag is set or not. When the starter flag is not yet set, a step 306 is now executed for making preparation for engine starting. For example, in the case of the embodiment being described, the zeroth bit in the register DOUT 194 of DIO 128 is set at level "H" for initiating operation of the fuel pump 190, as the result of which the fuel pump is electrically energized. Subsequently, the first bit in the register DOUT 194 is set to the level "L", which results in that the air solenoid valve 22 is controlled by the output signal from the EGRC circuit 178. In practice, the settings of the zeroth and the first bits in the register DOUT 194 are effected simultaneously.

At a step 308, the inhibiting of INTV IRQ is removed with the inhibiting of ignition. The removal of the inhibiting of INTV IRQ may be effected by setting the fourth bit (the flip-flop 739 in FIG. 22) in the register MASK 200 shown in FIG. 4 to the level "H", for example. Further, at the step 308, the starter flag is set. This flag indicates that the starter switch is in the closed state and this flag is employed in the decisions at the steps 304 and 312 described above.

At a step 310, bit "H" is set in a mode register described hereinafter for initiating operations of CABC 162, IGNC 168, FSC 176 and EGRC 178 which constitute output parts of the input/output circuit 108 (generation of signal "GO"). As a consequence, output pulse signals are supplied to the associated control devices. The program then returns to the step 302 from the step 310, and it is determined at the step 302 whether the starter switch 152 is in the closed state. Since the starter switch is closed in the engine starting mode, the result of the decision at the step 302 is affirmative or "YES". The program will then proceed to the step 304, at which step the starter flag is checked. If the starter flag is set, it is determined that the engine is being started. The program then returns to the step 302.

In this manner, as long as the starter motor is operated, the program is repeated in a loop between the "YES" outputs of the steps 302 and 304.

When the engine has been started, the starter switch 152 is turned off. The result of the decision step 302 is thus negative or "NO". The program then proceeds to the step 312, at which step the starter flag is checked. Since the starter flag is set, the program proceeds to the step 314 at which ENST IRQ is released from being inhibited. After the step 314, the stopping of the engine is detected by this ENST IRQ.

Next, the program 208 for the background jobs is executed, which program is illustrated in detail in FIG. 12.

Referring to FIG. 12, the program determines at a step 410 whether the idle switch 148 is closed or "ON" or not. If the answer is "YES", recirculation of exhaust gas is not carried out.

Consequently, the program proceeds to a step 412 where the air solenoid valve 22 is selected by setting the first bit in register DOUT 194 of DIO to the level "L". Accordingly, the air solenoid valve 22 shown in FIG. 1 is controlled in accordance with the value set at the register EGRD. The air solenoid valve 22 serving for controlling air flow through the bypass passage is controlled according to specific operating conditions. More particularly, in the case of operations at a low ambient temperature, such as in winter, the starting operation in the cooled state of engine, operation under a large load due to the use of a car air-conditioner or the like, the air flow through the bypass passage is increased. At a step 414, the duty factor of the air solenoid valve 22 is stored in the register EGRD in dependence on the temperature TW of engine cooling water. Further, the fuel supply quantity controlled by the solenoid fuel valve 20 is stored in the register FSCD in dependence on the coolant water temperature TW. The fuel solenoid valve 20 and the air solenoid valve 22 are controlled in accordance with the respective stored values to thereby control the engine operation in the idling mode. When the execution of the step 416 has been terminated, the program proceeds again to the step 410 to repeat the routine process described above.

On the other hand, when the idle switch 148 is in the open state, the air solenoid valve 22 is not controlled, while the recirculation of exhaust gas is effected. To this end, the EGR system for controlling the exhaust gas recirculation quantity is operated. For operating the EGR system 188 by using the value stored in the register EGRD, the first bit in the register DOUT 194 of DIO is set to the level "H" at the step 418. At a next step 420, the register FSCD is cleared, to thereby inhibit the operation of the fuel solenoid valve 15. At a step 422, the program determines whether the cooling water temperature is higher than a predetermined value such as TA °C., for example. If the answer is affirmative, the EGR operation is inhibited or interrupted. For this reason, the value for effecting EGR CUT is set at a step 426. When the cooling water temperature is found to be at or lower than the predetermined value (TA °C.), the program proceeds to the step 424 where the program determines whether the temperature of the cooling water is lower than a predetermined value TB °C. If so, the EGR operation is inhibited. To this end, a value for EGR CUT is set at a step 426. These values are placed in the register EGRD at a step 430.

The EGR operation takes place when the temperature TW of the cooling water is higher than TB °C. and lower than TA °C. The EGR quantity, i.e. the recirculated quantity of exhaust gas, is determined on the basis of the output signal VC from the negative pressure sensor 144 and the revolution number N of the engine. A map of EGR quantity in dependence on the sensor output VC and the revolution number N is provided in the ROM 104 at addresses B700 to B7FF, as is shown in FIG. 6. The EGR quantity is determined from this map through a search and retrieval process which is performed at a step 428. The retrieved value is then placed in the register EGRD at a step 430. The EGR system 188 illustrated in FIG. 4 is operated in accordance with the value set at the register EGRD.

In the case of the program shown in the flow chart of FIG. 12, the step 410 is resumed upon completed execution of the step 430 or 416. In this manner, the computer is able to always execute the routine extending from the step 410 to the step 416 or the routine extending from the step 418 to the step 430 for controlling the air solenoid valve 22. In this manner, unless any IRQ is issued, the program started at the entry point 202 will continue to be executed in the order of programs INITIALIZE 204, MONIT 206 and FISC or EGR 208, which are background jobs.

The execution of the programs MONIT 206 as well as the program 208 for the background job (FISC or EGR) can be interrupted by issuing an interrupt request or IRQ. When the processing operation commanded by IRQ has been completed, the execution of the program which was interrupted is resumed.

Now, referring to FIG. 5, processing operations due to the issuance or generation of IRQ will be described. The program 224 for analyzing the causes of IRQ comprises subprograms for the processing of ADC1 END IRQ 226, the processing of ADC2 END IRQ 228, the processing of INTV IRQ 230 and the processing ENST IRQ 232. For executing these subprograms 226, 228, 230 and 232, respectively, the contents of the associated IRQ as issued has to be at first examined. To this end, the contents of the STATUS register 198 shown in FIG. 4 are examined for determining why IRQ has been issued. In accordance with the cause which gives rise to the generation of IRQ, one of the subprograms 226, 228, 230 or 232 is executed, as a result of which the activation request QUEUE is issued to the TASK required to be executed among TASKS 252, 254, 256, 258 and 262.

In this connection, it should be mentioned that when too many IRQs are generated, a large amount of time is required for executing the supervisory program (hereinafter referred to as OS program), resulting in that the time available for arithmetic operations for engine control is eventually reduced or restricted. Accordingly, in the case of the embodiment being described, it is assumed that ADC2 END IRQ 228 is allowed to be generated only during the execution of the subprograms 204 or 206 (INITIALIZE or MONIT), but is otherwise inhibited. More specifically, at the step 314 of the MONIT program 206 shown in FIG. 8, an inhibit command i.e. "L" for ADC2 END IRQ is stored in the MASK register 200 (FIG. 4) by the flip-flop 766 which is shown in FIG. 22. ADC1 END IRQ 226 is originally inhibited. More specifically, at the start step 202, the MASK register responds to the general reset signal for the input/output circuit so that all interrupt requests are inhibited. The ADC1 END IRQ is caused to remain inhibited by preventing an inhibit-removing command from being issued.

An example of the program 224 is illustrated in FIG. 13. This program starts from an entry step 222 and, when the program determines at a step 500 that the ADC1 END IRQ is not produced, it proceeds to a step 502 at which it is determined whether the IRQ as issued is ADC2 END IRQ or not. If affirmative ("YES"), an execution or activation request is issued to the program of the task level "0" at a step 516. This can be accomplished by setting a flag of "1" at b6 of a task control word TCW0 in the RAM 106 shown in FIG. 15. The program then proceeds to the TASK SCHEDULER 242. In the case of the embodiment now being described, it is assumed that ADC2 END IRQ is allowed to be generated only during the execution of the INITIALIZE program 204 shown in FIG. 5, but is otherwise inhibited. When the decision at the step 502 is "NO", the program proceeds to the step 504 at which step the program determines whether the IRQ being issued is INT IRQ generated at a predetermined constant time interval or period. If affirmative or "YES", the program proceeds to a step 506. At the steps 506 to 514, INTV IRQ is examined in connection with the timing for activating the programs of the task level "0" to the task level "3". At first, examination is made as to the program of the task level "0". More specifically, the task control word of the task level "0" i.e. the counter 0 including bits b0 to b5 of TCW 0 shown in FIG. 15 is incremented by "1". In this connection, it should be noted that although upcounting is adopted in the case of the illustrated embodiment, a down-counting or decrementing may be of course adopted. At the step 508, the contents of the counter 0 of TCW 0 are compared with that of the task activating timer TTM0 shown in FIG. 15. Herein, the presence of "1" in TTM0 means that the program of task level "0" (denoted by 252 in FIG. 5) is activated every 10 m.sec., since it is assumed that the INTV IRQ is generated at a period or time interval of 10 m.sec. At the step 508, the contents of the counter CNTR0 and the task timer TTM0 are compared with each other. When coincidence is found (i.e. "YES"), the program proceeds to the step 510 at which step a flag "1" is set at b6 of the task control word TCW0. In the case of the illustrated embodiment, the bits b6 of every TCW represent the flags for requesting the activation of the associated tasks. The bit positions b0 to b5 of the counter CNTR0 are all cleared, because the flag of "1" is set at b6 of TCW0 at the step 510.

At the step 512, retrieval of the activation timing for the program of task level "1" is effected. At a step 514, the program determines whether the task of level "3" has ended, i.e. if n=4. Since n=1 in this case, the program returns to the step 506 at which step the contents of the counter CNTR1 of TCW1 in RAM 106 shown in FIG. 15 which is the task control word for the program of task level "1", are incremented by "+1". At the step 508, the incremented contents are compared with the contents of TTM1 of ROM 104 shown in FIG. 15. In the case of the illustrated embodiment, it is assumed that the contents of TTM1 are equal to "2". In other words, the timing period for activating the program of the task level "1" is 20 m.sec. Assuming now that the contents of the counter CNTR1 are equal to "1", the result of the decision at the step 508 is "NO", which means that the activation timing is not for the program 254 of the task level "1". Thus, the program proceeds to the step 512 at which step the task level of the program to be retrieved is updated again to the task level "2". In a similar manner, processing operations proceed up to the level "3", whereupon n becomes equal to 4 at the step 512. Thus, conditions n=MAX are fulfilled at the step 514. The process then proceeds to the task scheduler 242.

When no INTV IRQ is found at the step 504, the program proceeds to a step 518 at which step the program determines that the IRQ in question is ENST IRQ. When the decision made at the step 504 is "NO", the IRQ must necessarily be ENST IRQ. Accordingly, the step 518 may be omitted and the program may proceed directly to the step 520 at which step the fuel pump is stopped in accordance with a specific program based on the engine stopping condition. Additionally, all the output signals for the ignition system and the fuel supply control system are reset. The program then returns to the start step 202 shown in FIG. 5.

FIG. 14 shows in detail in a flow chart a program for the task scheduler 242. At a step 530, the program determines whether a task of task level "n" is to be executed. At first, n=0. Accordingly, a decision is made as to the necessity of the task of level "0" being executed. In other words, the presence of the task activation request is examined in the order of high to low priority levels. Such an examination can be made through the retrieval of bits from b6 to b7 of the respective task control words. Bit position b6 is allotted to the activation request flag. When "1" is present at this position b6, it is determined that the activation request is present. Further, b7 is allotted for the flag indicating that the associated task is under execution. The presence of "1" at b7 indicates that the associated task is under execution and is now being interrupted. Accordingly, when "1" is present at least one of b6 and b7, the scheduler program proceeds to the step 538.

At the step 538, the flag set at b7 is checked. The presence of "1" at b7 means that the execution is being interrupted. At a step 540, the execution being interrupted until then is resumed. Flags set at both b6 and b7 cause the decision at the step 538 to be affirmative or "YES", whereby the task program being interrupted is re-initiated. In the case where "1" is present only at b6, the activation request flag of the task of the corresponding task level is cleared at the step 542, which is followed by a step 544 where the flag is set at b7 (this flag will be hereinafter referred to as a RUN flag). The steps 542 and 544 show that the activation request for the task of the corresponding task level proceeds to the state in which the task is to be executed. Accordingly, at a step 546, the start address of the task program of the task level of interest is retrieved. This address can be determined from a start address table TSA provided in ROM 104 in correspondence to TCWs of the various task levels. By jumping to the start address as determined, the execution of the task program of interest takes place.

Referring again to FIG. 14, when the decision at the step 530 is "NO", this means that neither activation is an request issued to the program of the task level being retrieved nor is the program being momentarily interrupted. In this case, the scheduler program proceeds to the retrieval of the task of the next highest level. In other words, the task level n is incremented to (n+1). At this time, the program determines whether the incremented level index (n+1) is maximum, MAX, i.e. (n+1)=4. If not, the scheduler program proceeds to the step 530. The above processing operation is repeated until n has become equal to MAX or 4, whereupon the interrupted program for the background jobs is resumed at a step 536. In other words, it is confirmed at the step 536 that all programs for the tasks of levels "0" to "3" are not required to be executed, whereby the process returns to the point of the background job program at which the program has been interrupted in response to the appearance of IRQ.

FIG. 15 illustrates the relationship between the task control words TCW and the TTM task start address table representing the task activation time intervals or periods provided in ROM 104. In correspondence to the task control words TCW0 to TCW3, there are stored in ROM 104 the task activating periods TTM0 to TTM3. For every INTV IRQ, the counters CNTR or TCW are updated successively and a flag is set at b6 of the associated TCW upon coincidence between the contents of the counter and TTM for the task. When the flag is thus set, the start address of the task is retrieved from the task start address TSA. A jump is made to the retrieved start address, whereby the selected one of the programs 1 to 4 is executed. During the execution, a flag is set at b7 of the TCW in RAM 106 which corresponds to the program being executed. Thus, as long as this flag is set, the program determines that the associated program is being executed. In this way, the program for the task scheduler 242 shown in FIG. 5 is executed. As a consequence, one of the task programs 252 to 258 of the task levels "0" to "3" is executed. When IRQ is issued during the execution of any task program, the execution is interrupted again to deal with the IRQ. Assuming that no IRQ is issued, the task being presently executed will come to an end. Upon termination of the execution of the task program, EXIT program 260 is next executed.

The EXIT program 260 is illustrated in detail in FIG. 16. This program is composed of steps 562 and 564 for identifying the ended task. At the steps 562 and 564, retrieval is made successively starting from the task of level "0" to identify the task level of the completed task. At the next step 568, the flag RUN set at b7 of TCW corresponding to the ended task is reset, which means that the program for the identified task has been completely terminated. The process proceeds again for the task scheduler 242, whereby the program next to be executed is determined.

Execution and interruption of a program will be described more in detail by referring to FIG. 17. It is assumed now that the program 208 for the background job which is assigned with the lowest priority is being executed. When an INTV IRQ is issued at time t1, the supervisory program or OS program is to be executed in place of the background job program, whereby the process determines that the task program of level "0" is requested to be executed, for example, through execution of the programs 224 and 242 illustrated in FIG. 5. At a time point t2, a flag "1" is set at b7 of TCW0, while b6 thereof is cleared, whereby the program 252 of level "0" is executed. Assuming that a request for activating the program 254 of level "1" is also issued simultaneously, flag "1" is set also at b6 of TCW1. However, the program first to be executed is the task program of level "0" because of the higher priority thereof. When the execution of the program of level "0" ends at time t3, the OS program is resumed to clear the flag at b7 of TCW0 and the request for executing the program 254 of level "1" of the next high priority is accepted with preparation being made for the execution thereof. Execution of this program 254 begins at t4. It is assumed that during the execution of the program 254 of level "1" which takes a long period of time, a new INTV IRQ is issued. Then, the execution of the program of level "1" is interrupted at t5 and the OS program is resumed. When it is determined that the program to be activated in response to the present INTV IRQ is the program 252 of level "0" assigned with the highest priority, then this program 252 is executed at t6. More specifically, flag "1" is set at b7 of TCW0, while flag at b6 is cleared and the start address for the program 252 is retrieved from TSA0 to thereby allow the program 252 to be executed. This program comes to an end at a time point t7, resulting in the OS program being resumed, to clear the flag "1" at b7 of TCW0 with the aid of EXIT program. Subsequently, through the task scheduler program 242 of the OS program, another activation request or alternatively the program which is being interrupted is retrieved. Since the task program 254 of level "1" is interrupted, this program 254 is again executed. The re-initiation of the task program 254 is effected by feeding the contents of CPU 102, which have been set aside in a standby area at the time point t5, back again to CPU 102. The program 254 is thus restarted and comes to an end at a time point t9. Then, the OS program is resumed and the termination of the program 254 is indicated through execution of the EXIT program, i.e. clearing of flag "1" at b7 of TCW1.

In succession, the task scheduler program 242 is executed to search for possible activation request to the task programs as well as to the program being interrupted. For example, it is assumed that flag "1" set at b6 of TCW2 corresponding to the task program 256 is identified. Then, the start address for the program 256 is retrieved from TSA2 and a jump is made to the retrieved start address at which execution of the program 256 is begun. At this time, flag at b6 of TCW2 is cleared while flag "1" is set by b7 of TCW2. When execution of the program 256 ends at a time point t11, the OS program is resumed, whereupon EXIT program is executed to clear the flag set at b7 of TCW2. Subsequently, another activation request for the task program as well as to the interrupted program are searched. When no program to which the activation request is issued or which is being interrupted is found, data of the background job program 208 set aside at the standby area is fed back to CPU 102 to be processed. When INTV IRQ is issued at a time point t13, the contents existing in the CPU at that time are transferred to the standby area and the OS program is required to determine the program to which the INTV IRQ is issued to activate processing through the associated program.

As will be appreciated from the above description, whenever an interrupt request is issued, the program being executed is interrupted and the OS program is resumed to allow the program of the highest priority to be executed. In this manner, the program of more significance is given priority over less significant programs.

Further, since the programs are assigned to respectively different levels of priority and executed in succession in dependence on the levels of priority, while an indication is given as to the completed termination of the executed program, the time required for executing the OS program is significantly reduced, to provide an enhanced processing efficiency. Further, because competitive interrupts are not issued among the programs of the same level, the standby area to which the contents of the interrupted program is temporally loaded can be significantly reduced, since the standby area is sufficient for each of the priority levels of the programs.

The manner in which one of the program 252, 254, 256 and 258 of different levels is executed in accordance with the procedures described hereinbefore in conjunction with FIGS. 5 and 17 is illustrated in FIG. 18. In a standby state labelled IDLE, no request to activate a program is issued. When the activation request is generated, a flag "1" is set at b6 of the associated TCW to indicate the necessity of activation. The time duration required for the shift from IDLE to QUEUE is determined in dependence on the level of the program to which the activation request is issued. In the state QUEUE, the sequence of execution is determined in accordance with the priority allotted to the programs. In order to execute the program of concern, the flag at b6 of the associated TCW initially has to be cleared while the flag must be set at b7. The state in which the program is executed is represented by RUN in FIG. 18. Upon termination of execution, the flag at b7 of the associated TCW is cleared, to indicate the completion of the executed program. The state RUN is now replaced by the state IDLE for awaiting a new activation request. When IRQ is issued during execution of RUN of a program, the program has to be interrupted. The contents present at that time in CPU are set aside at a standby area. This state is indicated by the label READY. When the interrupted program is to be executed again, the contents in the standby area are fed back again to the CPU. In other words, the state READY is changed again to the state RUN. In this manner, each of the programs may take repeatedly the four states shown in FIG. 18. The flow shown in FIG. 18 is a typical one. It may happen that a flag "1" is set at b6 of TCW in the state READY. For example, this is the case in which a new activation request makes its appearance to the very program that is being interrupted. Under this situation, the flag set at b7 is allotted with a higher preference over the flag set at b6. Accordingly, the task program being interrupted is first executed. When the flag at b7 is reset, the executed program is shifted directly to the state QUEUE without assuming the state IDLE.

As will be appreciated from the foregoing description, the programs 252, 254, 256 and 258 of the different task levels take, necessarily, one of the states illustrated in FIG. 18. In this connection, it is important to note that the state READY is not present for each of the individual programs, but rather for each of the levels of programs. For example, the programs of level "1" comprises CARBC, IGNCAL and DWLCAL programs. The state READY is not present each for these individual programs, but is present for all the programs of level "1" as a whole. This means that the standby area need not be provided for each of the different programs, but it is sufficient to provide the standby area for each of the different levels of programs. Accordingly, the plural standby areas in RAM 106 in FIG. 15 are indicated by 602.

FIG. 19 illustrates the shifting in the state of the background job program. When an IRQ is issued during execution of this program, i.e. in the state RUN, the contents in the CPU are set aside at the relevant standby area, whereby the state READY is assumed. When the interrupt request has been processed, the contents in the standby area are fed back to the CPU, whereby the state RUN is resumed. The standby area as indicated by 602 in FIG. 15 can be used for this purpose.

FIG. 20 shows a program of level "0". The activation request to this program is generated at the timing of 10 m.sec, as is shown in the Table 1. At a step 650, data of ADC1 is fetched and at a step 654 an activation request for fetching next data from ADC1 is issued. Step 652 is provided to allow ADCEND IRQ to be effected before engine starting. When a flag indicating that the engine has not yet started is set, RTI, i.e. the program being interrupted, is resumed. This program corresponds to the INITIALIZE program 204 shown in FIG. 5. At a step 656, data is fetched from ADC2. At a succeeding step 658, activation is set to fetch new data from ADC2. At a step 660, data of engine speed is fetched or sampled. When all of these steps have been processed, then the subprogram EXIT of the OS program is executed, to thereby clear the flag set at b7 of the associated TCW.

FIG. 21 shows a program of level "1". At a step 672, the program determines whether the engine is being started. If the answer is affirmative, the program jumps to a step 678 at which step the ignition timing is calculated. At a step 674, the CARBCAL program is executed, which is followed by a step 676 at which the IGNCAL program is executed. These program executions are effected through data retrieval from the associated tables. At the step 678, the DWLCAL program is executed to arithmetically determine the duration or current flow duration for ignition.

A LAMBDA program allotted with the task level "2" is a program for correcting the λ-sensor, while the program HOSEI of level "3" is a program for determining correction factors in consideration of the atmospheric temperature, the cooling water temperature or the like. Since parameters for determining these factors have large time constants, parameters varying at a long interval may be utilized to this end.

As described hereinbefore, INTV IRQ is generated according to the teaching of the invention so that all the arithmetic operations for control may be carried out independently of engine speed. A hardware arrangement of a circuit for generating the IRQ is schematically shown in FIG. 22. Referring to this figure, a register 735 is loaded with data for setting the timer interrupt period (e.g. 10 m.sec) from the CPU through a data bus 752, while a counter 736 is concurrently supplied with clock pulses CLOCK. The data contents placed in the register 735 are compared with the count output from the counter 736 through a comparator 737 which produces an output signal upon coincidence of the contents between the register 735 and the counter 736. The output signal from the comparator 737 is used to set flip-flops 738 and 740. Simultaneously with the setting of the flip-flops 738 and 740, an output signal is produced from AND circuit 747, whereby the counter 736 as well as the flip-flop 738 are reset at the next clock pulse. When a flip-flop 739 is set, the timer interrupt signal IRQ is produced through an AND circuit 748 and an OR circuit 751. The flip-flop 739 serves to mask the timer interrupt signal IRQ when this signal is unnecessary (e.g. when the engine is being started). At that time, the flip-flop 739 is supplied with a reset command from CPU.

On the other hand, an ENST interrupt request, which is to be generated when the engine is stopped accidentally or due to a fault, is produced through a similar circuit arrangement as that for the timer interrupt, which comprises a register 741, a counter 742, a comparator 743, AND circuits 749 and 750, and flip-flops 745 and 746. The signal supplied to the counter 742 is however the one generated during rotation of the engine. This signal is the reference angular signal REF produced from the sensor 146 shown in FIG. 4 and may be produced for every rotation of 180° of the crank shaft in the case of a four-cylinder internal combustion engine. Since the counter 742 is reset when the signal REF is produced, no ENST interrupt signal can be generated. However, when the engine is stopped for the reasons described above, REF signal will disappear, whereby the counter 742 is released from the reset state. Thus, the ENST interrupt signal can be generated in the manner described above in conjunction with generation of the timer interrupt signal.

The timer interrupt signal IRQ triggers the activation of tasks as illustrated in the flow chart of FIG. 5, whereby the tasks are processed in accordance with the allotted priority levels. Namely, upon reception of an interrupt request, the CPU analyses the cause for the received interrupt request. When the interrupt request is determined to be the timer interrupt, the tasks 252, 254, 256 and 258 allotted with priority levels are activated and the task selected through the task scheduler 242 is executed. When the execution of task is terminated, a corresponding indication is made through the execution of the EXIT program. In response to the next timer interrupt signal, the task next to be executed is selected through the task scheduler.

Upon the appearance of the ENST interrupt signal, the fuel pump as well as the ignition system are turned off. All the input/output control circuits are disabled.

In a similar manner, upon the occurrence of ADC1 END IRQ or ADC2 END IRQ, a flip-flop 764 is set to "1", when the sequence operation of ADC1 has been terminated. When a flip-flop 762 is set to "1" from CPU through the bus 752, an AND gate 770 is then enabled to produce a service request signal to CPU for dealing with ADC1 END IRQ. However, when the flip-flop 762 is not set to "1", ADC1 END IRQ is inhibited. The same applies to ADC2. Upon termination of the sequence operation of ADC2, the flip-flop 768 is set to "1". When a flip-flop 766 is set to "1" at that time, ADC2 END IRQ is generated through an AND gate 772 and the OR gate 751. On the other hand, unless the flip-flop 766 is set to "1", the AND gate 772 remains disenabled, resulting in no ADC2 END IRQ being generated. In this manner, only when the flip-flop 739, 745, 762 and/or 766 is set to "1", an associated IRQ is issued and vice versa.

As listed in the Table 1, the priorities of programs are determined in dependence on the functions of the programs, wherein interval activation requests are issued in accordance with the priority. In this manner, main tasks for controlling engine operation are activated at predetermined intervals independently from rotation speed of the engine. Accordingly, the load imposed on the CPU may remain substantially constant to assure controls with high reliability and performances.

According to the arrangement shown in FIG. 5, the controlling efficiency is further improved by virtue of the fact that the activation period is varied for every level of the program. Further, since EXIT indication is made for each termination of program, execution of the OS program is not required upon transfer of programs among those of the same level, involving high speed processing to an advantage.

Since the programs of the same level are not mutually interrupted, it is sufficient to provide a standby area for different levels of the programs rather than for the individual programs. Thus, the space for the standby area can be significantly spared.

After the engine has been started, both ADC1 END IRQ and ADC2 END IRQ are masked. Thus, the use time of the OS program can be correspondingly reduced to enhance the processing efficiency.

According to the arrangement shown in FIG. 15, it is sufficient to make provision for each of the levels of the task programs rather than for each of the programs listed in the Table 1, whereby the area for TCW can be significantly reduced.

By virtue of such an arrangement that the TCW is provided with the flag (b6) for indicating the request for activating the associated one of the programs together with the flag (b7) for indicating execution of the program, the execution of individual programs, interruption and the resumption thereof can be effected smoothly in accordance with the priorities assigned to the programs, as a result of which a high improved control efficiency of the CPU can be attained.

Next, a second embodiment of the invention applied to an internal combustion engine of a fuel injection type will be described by referring to FIGS. 23 to 33.

It should be noted at first that the second embodiment differs from the first only with respect to the type of the internal combustion engine and thus the essential features of the invention for controlling the engine operations remain essentially unchanged.

Referring to FIG. 23 which shows a control apparatus for the overall system of the fuel injection type internal combustion engine, suction air is supplied to engine cylinders 1008 from an air cleaner 1002 through a throttle chamber and an air intake conduit or manifold 1006. Combustion product gas is exhausted to the atmosphere from the cylinders 1008 though an exhaust conduit 1010.

There is provided in the throttle chamber 1004 an injector 1012 for fuel injection. The fuel injected from the injector 1012 is atomized in an air passage provided within the throttle chamber 1004 and mixed with air to thereby form a fuel-air mixture which is then supplied to combustion chambers of the engine cylinders 1008 through the intake manifold 1006 and associated air suction valves 1020.

Throttle valves 1014 and 1016 are provided in the vicinity of the outlet orifice of the injector 1012 at the upstream side thereof. The throttle valve 1014 is mechanically interlocked with the accelerator pedal so as to be operated by the driver. On the other hand, the throttle valve 1016 is arranged to be controlled by a diaphragm chamber 1018 in such manner that the valve 1016 is fully closed in a range of a small air flow, while the throttle valve 1016 is increasingly opened as a function of a negative pressure in the diaphragm chamber 1018 which pressure in turn is increased as the air flow is increased, thereby to prevent resistance to the air flow from being increased.

A bypass air passage 1022 is disposed in the throttle chamber 4 upstream of the throttle valves 1014 and 1016. An electric heater element or hot wire 1024 constituting a part of a thermal type air flow meter is disposed in the air passage 1022. Derived from the thermal type air flow meter is an electric signal which varies in dependence on the air flow speed and the thermal conductivity of the heater element 1024. Because of being disposed in the bypass passage 1022, the hot wire element 1024 is protected from the adverse influence of a high temperature gas produced upon occurrence of back-fire in the cylinders 1008 as well as from contamination due to dust carried by the suction air flow. The outlet of the bypass air passage 1022 is located in the vicinity of the narrowest portion of a Venturi structure, while the inlet port of the bypass passage 1022 is opened in the throttle chamber upstream of the Venturi.

Fuel is supplied to the fuel injector 1012 from a fuel tank 1030 through a fuel pump 1032, a fuel damper 1034, a filter 1036 and a fuel pressure regulator 1038. The fuel pressure regulator 1038 serves to control the pressure of fuel supplied therefrom to the injector 1012 through a pipe 1040 so that difference between the pressure of fuel supplied to the injector 1012 and the pressure prevailing in the suction manifold 1006 in which the fuel is injected is maintained at a predetermined value. Reference numeral 1042 denotes a feedback pipe through which fuel in excess is returned to the fuel tank 1030 from the fuel pressure regulator 1038.

The fuel-air mixture drawn in through the suction valve 1020 is compressed by a piston 1050 within the cylinder and undergoes combustion as ignited by a spark produced at a spark plug 1052. The cylinder 1008 is cooled by cooling water the temperature of which is measured by a water temperature sensor 1056. The output quantity from the sensor 1056 is utilized as a control parameter representing the temperature of the engine. The spark plug 1052 is supplied with a high voltage pulse from an ignition coil 1058 in accordance with proper ignition timing.

A crank angle sensor (not shown) is provided in combination with a crank shaft (not shown) of the engine for producing a reference angle signal for every reference crank angle and a position signal for every predetermined angle (e.g. 0.5°) of rotation of the engine.

The electrical signals output from the crank angle sensor, the water temperature sensor 1056 (the output signal of which is denoted by 1056A) and the thermal type air flow sensor 1024 are applied to the input of a control circuit 1064, which is constituted by a microcomputer and associated circuitry to be arithmetically processed, whereby the injector 1012 and the ignition coil 1058 are driven by the signals derived from the output of the control circuit 1064.

Further disposed in the throttle chamber 1004 is a bypass passage 1022 communicating with the intake manifold 1006 across the throttle valve 1016, and a bypass valve 1062 adapted to be opened or closed under control is disposed in the bypass passage 1022.

The bypass valve 1062 disposed in the bypass passage 1022 across the throttle valve 1016 is so controlled as to vary the flow section area of the bypass passage 1022 in accordance with the lift of the valve 1062 which in turn is actuated by a driving system controlled by a pulse current output from the control circuit 1064. To this end, the control circuit 1064 produces a periodic ON/OFF signal for controlling the valve driving system which, in turn, supplies a control signal to the associated drive unit of the bypass valve 1062 for adjusting the lift or stroke thereof.

FIG. 24 shows the general arrangement of the overall electronic control system for the internal combustion engine of the fuel injection type described above. In this figure, the same components as or equivalent to those shown in FIG. 4 are denoted by the like reference numerals. Description will be made of those components which differ from those shown in FIG. 4.

The analog output signal from the air flow sensor denoted herein by 1024 (hereinafter referred to as AFS) is supplied to the ADC2 to be converted into a corresponding digital quantity through an analog-to-digital converter circuit 172 (hereinafter referred to as ADC) and stored in a register 174 (hereinafter referred to as REG).

Next, description will be made of the control operation and objects to be controlled by the pulse output circuit in dependence on the results of arithmetic operations of the CPU. An injector control circuit 1134 (hereinafter referred to as INJC) functions to convert the digital value representing the results of the arithmetic operation into a corresponding pulse signal. More specifically, a pulse signal having a pulse duration or width corresponding to the quantity of fuel to be injected is produced by the INJC 1134 and applied to an injector denoted herein by 1012 through an AND gate 1136.

An ignition pulse generator circuit 1138 (hereinafter referred to as IGNC) comprises a register for storing therein an ignition timing (hereinafter referred to as ADV) and a register (hereinafter referred to as DWL) for storing therein a time point for the current flow through a primary winding of the ignition coil. These data placed in the registers ADV and DWL are supplied from the CPU 102. The pulse signals produced on the basis of the data placed in these registers are supplied through an AND gate 1140 to the amplifier 62 described hereinbefore in conjunction with FIG. 2.

The opening degree of the bypass valve denoted herein by 1062 is controlled by a pulse signal supplied thereto from an ignition control circuit 1142 (hereinafter referred to as ISCC) through an AND gate 1144. To this end, the ignition control circuit ISCC 1142 is composed of a register ISCD for setting therein a pulse width of the pulse signal and a register ISCD for setting therein a pulse repetition rate or period of the pulse signal.

The EGR control pulse generator circuit 178 (hereinafter referred to as FGRC) for controlling the transistor 90 which in turn controls the EGR control valve 86 shown in FIG. 3 is composed of a register EGRD for setting therein a value representative of the duty cycle of the pulse signal applied to the transistor 90 and a register EGRP for setting therein a value representative of the pulse repetition period of the same pulse signal. The output pulse from the EGRC is applied to the transistor 90 through an AND gate 1156.

The single-bit input/output signals are controlled by the circuit DIO (128). The input signals include the IDLE-SW signal, TOP-SW signal and the START-SW signal described hereinbefore. The output signal includes a pulse output signal for driving the fuel pump. The DIO 128 is provided with a DDR register 192 for determining whether the terminal thereof is to be used as the input terminal or the output terminal, and a register DOUT 194 for holding the output data.

A mode register 1160 (hereinafter referred to as MOD) functions to hold instructions for commanding the various inner states of the input/output circuit 108. For example, in accordance with the command set in this MOD register 1160, all AND gates 1136, 1140, 1144 and 1156 are controlled with respect to enabling and disabling conditions. Further, in accordance with the contents in the MOD register 1160, initiation as well as termination of the output signals from INJC, IGNC and ISCC can be controlled.

In the Table 1 above, the program CARBC of level 1 is unnecessary in the case of the embodiment being now described because no carburetor is provided and thus has to be replaced by a program INJC which has a function to arithmetically determine the fuel injection quantity. The activation of this program is effected by an interrupt request INTV IRQ produced for every 20 m.sec. Except for this program, the contents listed in the Table 1 apply to the second embodiment.

Describing the program INITIALIZE only with respect to the difference from the one shown in FIG. 7, at a step 290 shown in FIG. 25, the program AD1 IN is again executed upon completion of the analog-to-digital conversion of the output signal from the sensor 1056, whereby the digital value representing the output signal from the water temperature sensor TWS 134 and set in the register REG 166 is fetched and stored at the DATA area of ROM 104 in a similar manner as in the case of the first embodiment. At a step 296, the opening degree of the air bypass valve 1062 is arithmetically determined for starting the engine on the basis of the characteristic relationship illustrated in FIG. 10 in a similar manner as in the case of the first embodiment, the results of the arithmetic operation being placed in the register ISCD. At a step 298, the initial value for the fuel injection timing is arithmetically determined. The arithmetic operation to this end is effected on the basis of the relationship illustrated in FIG. 26 and the results thereof are placed in the register INJD. FIG. 26 graphically shows preset values of the duration of fuel injection or fuel quantity to be injected relative to the temperature of engine cooling water. This graph corresponds to the one shown in FIG. 10.

The program for the background job is executed in accordance with the flow chart shown in FIG. 27.

At a step 410, the program determines whether IDLE-SW 148 is turned on. If so, recirculation of the exhaust gas is not to take place. Accordingly, the program proceeds to a step 412 where the register EGRD is set to zero. At a step 414, the duty cycle of the air bypass valve 1062 is arithmetically determined in dependence on the temperature of the cooling water, the results of which is placed in the register ISCD at a step 416. In accordance with the value set at this register, air bypass flow to the engine is determined. Upon termination of the step 416, the step 410 is again executed. The above process is repeated in a closed loop, so long as no service request for IRQ is issued to CPU.

On the other hand, when the IDLE-SW is turned off, the ISC operation is not carried out. Consequently, the register ISCD is cleared. In this state, the EGR quantity is arithmetically determined. To this end, the program determines whether the cooling water temperature TW is higher than a predetermined level TA °C. If the answer is affirmative, the program proceeds to a step 426 to clear the register EGRD in order to inhibit the EGR operation. In contrast, when the cooling water temperature TW is lower than TA °C., the program proceeds to a step 424 to make the decision whether the cooling water temperature TW is lower than a predetermined level TB °C. If so, then the EGR operation is also inhibited. Accordingly, the step 426 is executed to set the register EGRD to zero. The temperature level TA at the step 422 indicates the upper limit of TW with TB indicating the lower limit of TW in the temperature range in which EGR operation is allowed to be carried out. Thus, when TB ≦ TW ≦ TA, the program proceeds to a step 428 where the quantity of EGR (i.e. exhaust gas recirculation) is arithmetically determined on the basis of the intake air quantity QA and the engine rotation speed N through searching a corresponding map which is provided in ROM at addresses B700 to B7FF shown in FIG. 6. The retrieved value is set at the register EGRD at a step 430. As the consequence, the EGR valve is opened to the opening degree determined on the basis of the value set at the register EGRD and the duty cycle preset at the register EGRP, whereby the EGR operation is now performed.

In the case of the flow chart shown in FIG. 27, the step 410 is resumed upon end of the step 430 or step 416. Accordingly, the computer executes constantly the routine from the step 410 to the step 416 for controlling the air bypass valve 1062 or the routine from the step 420 to the step 430 for controlling the EGR quantity.

In this manner, unless IRQ is issued, the program started from the start point 202 (FIG. 5) continues to be executed through the subprograms INITIALIZE 204 and MONIT 206 to the subprogram ISCCO for the background job or to the subprogram EGR CON.

FIG. 28 is a flow chart to illustrate execution of a program of level "1". At a step 672, a decision is made as to whether the engine is being started. If the answer is affirmative or "YES", the fuel quantity as well as the ignition timing required for the engine starting operation as determined by other relevant programs of level "1" are not required to be executed. In other words, when inhibition of INTV IRQ is removed at the steps 308 and 310 of the program MONIT shown in FIG. 8, whereby the program SFTMR1 is activated, for example, the result of the decision at the step 672 will be affirmative or "YES" because the starter flag is set. Consequently, the timing at which the primary winding of the ignition coil is made conductive is arithmetically determined at a step 678, whereupon execution of the program is terminated. In the case where the engine is not being started, the program proceeds from the step 672 to a step 674 at which the program INJC is executed, whereby the fuel injection quantity is determined from the AF map shown in FIG. 6 on the basis of the suction air quantity QA determined through execution of SFTMR0 and the rotation speed N of the engine. The injection quantity is modified by other factors through execution of the program LAMBDA and additionally corrected in consideration of other factors through execution of the program HOSEI. The value thus obtained is set at the register INJD.

When the execution of program INJC comes to an end, the IGNCAL program is executed at a step 676. Through execution of the program IGNCAL, the ignition timing is determined on the basis of factors QA and N retrieved from the map shown in FIG. 6, the results of this operation being set at the register ADV.

Upon termination of the program IGNCAL, the DWLCAL program is executed at a step 678 to determine the time point at which the primary winding of the ignition coil is turned on. The value thus obtained is loaded in the register DWL.

When the programs INJC, IGNCAL and DWLCAL have been executed, a jump is made to the program EXIT for issuing indication of termination of these programs.

FIG. 29 shows in detail CABC 165, FSC 176, EGRC 178 shown in FIG. 4 and ISCC 1142 and EGRC 178 shown in FIG. 24. The contents of the registers CABD, FSCD, ISCD and EGRD shown in FIG. 24 represent the width of each pulse, respectively, and correspond to a register 802 shown in FIG. 29. Further, there is provided a register 806 which corresponds to CABP, FSCP, ISCP and EGRP.

It is assumed now that a bit "H" is set at bit position b0 in a MODE register 1160. Then, both AND gates 1144 (FIG. 24) and 816 are enabled. A timer 804 constituted of a counter circuit counts clock signal from the AND gate 816. The count value B is compared with the contents placed in the register 806 through a comparator 810. When the count value B is increased beyond the value C stored in the register 806, the timer 804 is reset. In this manner, the timer 804 repeats the counting operation at a period determined by the value C stored in the register 806.

The count value of the timer 804 is compared with the value stored in the register 802 through a comparator 808. When the count value B of the timer counter 804 is smaller than the value A set at the register 802, a flip-flop 812 is set. On the other hand, when the value B is greater than A, the flip-flop 812 is reset. In this manner, the time interval during which the flip-flop 812 is in the set state is determined by the value A stored in the register 802. By increasing the value A, the duration of the set state of the flip-flop 812 is correspondingly increased.

Since the counting operation of the timer 804 is repeated at a frequency corresponding to the value set at the register 806, the set output of the flip-flop 812 is repeatedly produced at a frequency corresponding to the value set at the register 806 and is output through the AND gate 1144 enabled by the bit of level "H" at b0 of the MODE register 1160 (FIG. 24).

When the bit at the bit position b0 of the MODE register 1160 is set at level "L", the AND gates 1144 and 816 are disabled or blocked, whereby the output from the flip-flop 812 is interrupted and at the same time the input to the timer 804 is also interrupted.

By supplying control data to the MODE register shown in FIG. 24 from CPU, the start or stop of operation of the circuit shown in FIG. 29 can be controlled. In the case of the circuit shown in FIG. 29, the AND gates 1144 and 816 are controlled by the bit at the position b0 of the MODE register which bit controls the ISCD (1142) shown in FIG. 24. The EGRC 178 shown in FIG. 24 is implemented in a circuit arrangement similar to the shown in FIG. 29. However, it should be noted that while the start and the stop of operation of ISCC 1142 is under the control of the bit at b0 of the MODE register, operation of the EGRC 178 is controlled by the bit at the bit position b2 of the MODE register.

FIG. 30 shows in detail a circuit arrangement of the IGNC 168 shown in FIG. 4 and the IGNC 1138 in FIG. 24. Data for controlling the time point at which the primary winding of the ignition coil is energized is loaded in the DWL register from CPU, while data for the ignition timing is set at the ADV register. It is assumed now that the value set at the DWL register 1168 is represented by A, while the set value of the ADV register 1169 is represented by C.

Assuming that the bit at the bit position b1 of the MODE register 1160 is at "H" level, the AND gate 1156 and 860 are then enabled, i.e. in the conducting state, whereby POS pulses are applied to the counter 850 through AND gate 860. Consequently, the count value of the counter 850 is increased as a function of the engine crank angle and is cleared by the REF (reference) pulse. The count value at which the counter 850 is cleared by the REF pulse is represented by B. When the value A set at the DWL register 1168 is greater than B, the output from the comparator 852 is supplied through OR gate to the flip-flop 856 to reset the latter. Consequently, no pulse output is produced from the AND gate 1156. When the count value of the counter 850 is increased beyond the value A set at the DWL register 1168, the flip-flop 856 is set by the output pulse from the AND gate 864. The set output from the flip-flop 856 is then applied to the ignition system through AND gate 1156, as a result of which a current flows through the primary winding of the ignition coil. When the count value is further increased, the flip-flop 856 is again reset by the output signal ($C \leq B$) from the comparator 854. Then, the pulse output from the AND gate 858 is interrupted, resulting in the generation of spark for ignition.

FIG. 31 shows in detail an arrangement of the DIO 128 described hereinbefore in conjunction with FIGS. 4 and 24. The signal from the bit position of DDR at which the bit "H" is set is applied to the associated one of tristate drivers 872 to 886, whereby the associated tristate driver becomes conductive. As a consequence, the bit of DOUT which corresponds to the bit "H" in DDR is output through the associated tristate driver. On the other hand, signals present at lines DI00 to DI07 can be arbitrarily read by the CPU through buffer amplifiers 892 to 904. The signals present at the lines corresponding to the non-conducting ones of tristate drivers 872 to 886 depend on the external conditions. Accordingly, the external conditions are read for these lines.

FIG. 32 shows in detail an arrangement of the INJC 1134 shown in FIG. 24. The REF pulse derived from the output of the crank angle sensor is produced at a predetermined crank angle (e.g. 80° or 90°) before reaching the upper dead point (TDC). The relationship between the upper dead point (TDC) of the crank and the REF pulse is illustrated in FIG. 33 at (A) and (B). On the assumption that the bit at the bit position b4 of the MODE register 1160 is at "H" level, gates 910, 912 and 1136 (FIG. 24) are in the conducting state. Accordingly, the count value of a counter 904 is cleared by every REF pulse, as is illustrated in FIG. 33 at (C). A register 902 functions to receive and hold the value A from the CPU. This value A is utilized to determine the time point at which fuel injection is initiated. The value A is compared with the count value B through the comparator 906 to set a flip-flop 908.

When the flip-flop 908 is set, a pulse is supplied to the injection valve 1012 through an AND gate 1136. A gate 912 is opened, whereby a timer 916 constituted by a counter counts clock pulses. A register 914 corresponds to the INJD register shown in FIG. 24. During a time interval corresponding to a value C set in this register, the injection valve is opened. More particularly, as long as the count value D of the timer 916 is smaller than the set value C, the flip-flop 920 is set. However, when C≦D, the flip-flop 920 is reset to block the AND gate 1136. Thus, the injection pulse is interrupted.

In the manner described above, the time point for initiating the fuel injection as well as the opening duration of the fuel injection valve can be controlled.

By setting the bit at the bit position b4 of the MODE register 1160 to zero ("L" level), the gate 1136 is blocked and all the operations can be stopped.

As will be appreciated from the foregoing description, the start and the stop of the output side of the input/output interface can be controlled at will from CPU according to the invention, whereby erroneous operations can be prevented from occurrence with a high reliability.

For the preparation for starting the engine, initial values for activating the input side of the input/output interface circuit such as the value for measurement of the rotation speed of the engine are set and an input or output designation is made to the individual bits of DIO. Further, the conditions of IRQ for requesting services to CPU 102 from the input/output interface circuit 108 are set, while inhibition of IRQ at the input side is removed. Next, the input data required for the engine starting is fetched and the values to be set for the starting operation are arithmetically determined on the basis of the fetched data. After these values have been set at the individual registers of the input/output circuit 108, the starting operation of the starter is monitored. When the starting of the starter is confirmed, then the system at the output side of the input/output circuit 108 is activated. The output side can be activated as soon as the engine starting takes place, since the conditions for the engine start have been beforehand prepared. Erroneous operation of the control system for the engine can be positively prevented, because the system at the output side of the input/output circuit 108 is prevented from being activated until the engine is started. Remarkable reduction can be attained in electric power consumption. Heat generation at the input/output interface circuit 108 and the amplifiers for amplifying output signals from the circuit 108 can be suppressed to a minimum.

Since the inhibition of INTV IRQ is removed at the step 308 of the MONIT program shown in FIG. 8, the INTV IRQ is accepted during the processing in the closed loop extending through the "YES" outputs of the steps 302 and 304, whereby CPU 102 can perform more important jobs in accordance with INTV IRQ. In this manner, results of arithmetic operations obtained from the constantly updated input data can be set at the registers IDJD, ADV, DWL, ISCD and EGRD of the input system.

The battery voltage undergoes a variation when the starter motor is started. In this connection, it is very important to alter rapidly and correspondingly the set values of the registers provided at the output side. Such updating or alteration can be accomplished according to the disclosed teachings of the present invention.

Since the arithmetic determination of the fuel injecting operation is realized through the properly timed interrupts according to the invention, the load imposed on the arithmetic unit can be stabilized independently from the operating conditions of the internal combustion engine.

I claim:

1. A method of operating a processor-controlled system, in which output signals are produced as a result of the processor carrying out a plurality of tasks the functions of which affect the operation of said system, and wherein there are provided a plurality of task programs through the execution of which said tasks are performed, each task program having a prescribed level of priority assigned thereto in accordance with its functional effect on the operation of said system, comprising the steps of:
   (a) generating successive interrupt signals to which said processor responds in executing said task programs;
   (b) in response to a respective one of said interrupt signals, issuing execution request signals for task programs currently requiring service;
   (c) upon completion of step (b), initiating the execution of the task program or programs, the task program level of which is highest among those programs for which execution request signals have been generated in step (b); and
   (d) upon completion of the execution of a task program or programs in step (c), determining which task program or programs is to be next executed and thereupon proceeding with its execution.

2. A method according to claim 1, wherein said task programs are assembled into a plurality of groups, having respectively different execution intervals.

3. A method according to claim 1, wherein those task programs which are to be executed as a group share the same level of priority.

4. A method according to claim 1, wherein step (d) comprises the steps of:
   (d) upon the completion of the execution of a task program or programs in step (c), but prior to the generation of an interrupt signal in step (a), determining whether there remain any execution request signals that have been issued in step (b) but whose corresponding programs have not been executed, and
   (d2) in response to step (d) determining that there remains any outstanding execution request signal whose corresponding program is awaiting execution, proceeding to step (c) and thereby executing the task program or programs the task program level of which is highest among those programs for which executive request signals have been generated in step (b) and currently require service.

5. A method according to claim 1, wherein step (c) includes the steps of:
   (c1) initiating the execution of the task program or programs the task program level of which is highest among those programs for which execution request signals have been generated in step (b), and
   (c2) in response to an interrupt signal prior to completion of said execution, interrupting said execution and causing the issuance of an execution request signal for the task program or programs being executed in step (c1).

6. A method according to claim 5, wherein step (c) further includes the step of
   (c3) prior to step (c1), examining the execution request signals that have been issued in step (b) to determine which task program or programs currently awaiting execution has the highest program level.

7. A method according to claim 1, wherein the levels of priority of said task programs are arranged such that those programs having different execution intervals have correspondingly different priority levels.

8. A method according to claim 7, wherein step (b) comprises the steps of:
   (b1) storing, for a respective task program group, a respective task control word, a first prescribed segment of which is representative of its associated execution interval,
   (b2) sequentially modifying the contents of said first prescribed segment, and
   (b3) in response to the contents of said first prescribed segment of said task control word coinciding with the time of occurrence of its associated execution interval, issuing an execution request signal for said respective task program group.

9. A method according to claim 8, wherein step (b3) comprises the step of changing the contents of a second prescribed segment of said respective task control word.

10. A method according to claim 8, wherein step (b3) comprises comparing the contents of said first prescribed segment of said task control word with a reference code associated with said respective task program group, and causing said execution request signal to be issued in response to the coincidence of the contents of said first prescribed segment of said task control word and said reference code.

11. A method according to claim 7, wherein step (b) comprises the steps of:
   (b1) storing, for the respective task program groups, respective task control words, a first prescribed segment of each of which is representative of its associated execution interval,
   (b2) sequentially modifying the contents of the first prescribed segment of the task control word associated with each respective task program group, and
   (b3) in response to the contents of the respective first prescribed segments of said task control words coinciding with the times of occurrence of their associated execution intervals, issuing respective execution request signals for said respective task program groups.

12. A method according to claim 11, wherein step (b) is carried out in a sequential manner among said groups from the group having the highest priority level to the group having the lowest priority level.

13. A method according to claim 9, wherein step (c) includes the step of changing the contents of a third prescribed segment of said respective task control word indicative of the execution of said the task program or programs.

14. A method according to claim 13, wherein step (c) further includes the step of changing the previously changed contents of said second prescribed segment of said respective task control word thereby terminating the issuance of said execution request signal.

15. A method according to claim 1, wherein step (c) further includes the step of terminating the issuance of an execution request signal associated with the program level, the task program or programs of which are to be executed in step (c).

16. A method according to claim 1, wherein step (c) further includes the step of storing the starting address of the first program in each respective group and beginning the execution of the task program or programs of a group to be executed by referencing its associated starting address.

17. A method according to claim 3, wherein said processor-controlled system comprises a combustion engine control system having sensor means for supplying engine condition signals representative of operating conditions of the engine in response to which said processor carries out said plurality of tasks, and wherein the group of tasks having a relatively high level of priority includes tasks for coupling data representative of said engine condition signals to said processor.

18. A method according to claim 17, wherein groups of tasks having relatively low levels of priority include tasks for calculating engine operation parameters in accordance with which output signals for controlling the operation of said engine are produced.

19. A method of operating a processor-controlled system, in which output signals are produced as a result of the processor carrying out a plurality of tasks the functions of which affect the operation of said system, and wherein there are provided a plurality of task programs through the execution of which said tasks are performed, comprising the steps of:
   (a) generating successive interrupt signals to which said processor responds in executing said task programs;
   (b) in response to a respective interrupt signal, storing in memory execution request signals for task programs currently requiring service; and
   (c) upon completion of the storage of execution request signals in step (b), searching said memory for the presence of said execution request signals and initiating the execution of a selected task program associated with one of the execution request signals stored in step (b).

20. A method according to claim 19, further including the step of
   (d) upon completion of the execution of said selected task program in step (c), searching said memory for the presence of an execution request signal associated with a task program currently requiring execution and initiating the execution of a further selected task program for which an execution request signal was stored in step (b) and is currently awaiting execution.

21. A method according to claim 19, further including the steps of:
   (d) upon the completion of the execution of said selected task program in step (c), but prior to the generation of a successive interrupt signal in step (a), determining whether there are stored in memory any execution request signals whose corresponding programs have not been executed; and (e) in response to step (d) determining that there is stored in memory an execution request signal whose corresponding program is awaiting execution, initiating the execution of a further selected task program.

22. A method according to claim 1, wherein step (c) includes the steps of:

(c1) initiating the execution of a selected task program for which an execution request signal was stored in memory in step (b), and (c2) in response to an interrupt signal prior to completion of said execution, interrupting said execution and storing in memory an execution request signal for the selected task program being executed in step (c1).

23. A method according to claim 19, wherein each task program has a prescribed level of priority assigned thereto in accordance with its functional effect on the operation of said system, and wherein step (c) comprises searching said memory for the presence of execution request signals and initiating the execution of that task program whose level of priority is highest among those programs for which an execution request signal has been stored.

24. A method according to claim 19, wherein each task program has a prescribed level of priority assigned thereto in accordance with its functional effect on the operation of said system, and step (b) comprises the step of:

storing in memory respective task control words associated with the respective levels of priority of said task programs and in accordance with which the execution of said task programs is controlled, a first prescribed segment of each task control word being indicative as to whether or not there is an execution request signal for a task program of that level.

25. A method according to claim 24, where step (b) further comprises the steps of:

providing, in each respective task control word, a second prescribed segment which is representative of the execution interval of an associated task program, sequentially modifying the contents of said second prescribed segment, and in response to the contents of said second prescribed segment of said task control word coinciding with the time of occurrence of its associated execution interval, causing the contents of said first prescribed segment of said task control word to be representative of an execution request signal.

26. A method according to claim 25, wherein said causing step comprises comparing the contents of said second prescribed segment of said task control word with a reference code associated with said respective task program, and causing the contents of said first prescribed segment of said task control word to be representative of said execution request signal in response to the coincidence of the contents of said second prescribed segment of said task control word and said reference code.

27. A method according to claim 25, wherein step (c) includes the step of:

changing the contents of a third prescribed segment of said respective task control word indicative of the execution of a task program.

28. A method according to claim 27, wherein step (c) further includes the step of changing the previously changed contents of said first prescribed segment of said respective task control word, thereby terminating the issuance of said execution request signal.

29. A method according to claim 24, wherein step (b) comprises the steps of:

storing, for respective task programs, respective task control words, a second prescribed segment of each of which is representative of its associated execution interval, sequentially modifying the contents of the second prescribed segment of the task control word associated with each respective task program, and in response to the contents of the respective second prescribed segments of said task control words coinciding with the times of occurrence of their associated execution intervals, causing respective first prescribed segments of said task control words to be indicative of execution request signals for said respective task programs.

30. A method according to claim 29, wherein said task programs have different levels of priority, and wherein step (b) is carried out in a sequential manner from the level having the highest priority to the level having the lowest priority.

31. A method according to claim 19, wherein said task programs are arranged in a plurality of groups, having respectively different execution intervals.

32. A method according to claim 31, wherein said task programs have levels of priority such that those programs having different execution intervals have correspondingly different priority levels.

33. A method according to claim 19, wherein step (c) includes the step of storing in memory an execution-run signal for said selected task program and thereafter initiating the execution of the selected task for which an execution-run signal has been stored in memory.

34. A method according to claim 33, further including the step of (d) upon completion of the execution of said selected task program in step (c), searching said memory for the presence of an execution request signal associated with a task program currently requiring execution and initiating the execution of a further selected task program for which an execution request signal was stored in step (b) and is currently awaiting execution.

35. A method according to claim 34, further including the step of (e) terminating the storage in memory of said execution request and execution-run signals for said selected task program.

36. A method according to claim 19, wherein step (c) further includes the step of terminating the issuance of an execution request signal associated with the task program which is executed in step (c).

37. A method according to claim 19, wherein step (c) further includes the step of storing in memory the starting address of a program and beginning the execution of the task program to be executed by referencing its associated starting address.

38. A method according to claim 19, wherein each task program has a prescribed level of priority assigned thereto in accordance with its functional effect on the operation of said system and wherein said processor-controlled system comprises a combustion engine control system having sensor means for supplying engine condition signals representative of operating conditions of the engine in response to which said processor carries out said plurality of tasks, and wherein a group of tasks having a relatively high level of priority includes tasks for coupling data representative of said engine condition signals to said processor.

39. A method according to claim 38, wherein groups of tasks having relatively low levels of priority include tasks for calculating engine operation parameters in accordance with which output signals for controlling the operation of said engine are produced.

40. A method according to claim 19, wherein step (b) comprises the steps of:

storing in memory first data in accordance with which execution request signals are to be generated and second data associated with respective ones of said task programs, successively modifying said second data, and in response to respective second data defining a prescribed relationship with respective first data, causing a respective execution request signal to be stored in memory.

41. A method according to claim 40, wherein said first data have a prescribed order of arrangement in memory corresponding to the order of arrangement of said second data.

42. A method according to claim 40, wherein said first data is representative of the frequency of occurrence of respective execution request signals.

43. A method according to claim 40, wherein step (c) further includes the step of storing in memory the starting address of a program and beginning the execution of the task program to be executed by referencing its associated starting address.

44. A method according to claim 43, wherein, in memory, the order of arrangement of respective starting addresses of task programs associated with respective execution request signals corresponds to the order of arrangement of said second data.

45. A method according to claim 44, wherein said first data have a prescribed order of arrangement in memory corresponding to the order of arrangement of said second data.

46. A method according to claim 19, wherein said processor-controlled system comprises a combustion engine control system having sensor means for supplying engine condition signals representative of operating conditions of the engine in response to which said processor carries out said plurality of tasks, and wherein each task program has a prescribed level of priority assigned thereto in accordance with its functional effect on the operation of said system and is comprised of a plurality of subtasks each associated with a respective engine function corresponding to a respective effect on engine operation.

* * * * *